(12) United States Patent
Nagano

(10) Patent No.: US 7,013,534 B2
(45) Date of Patent: Mar. 21, 2006

(54) TWO-LOOP COILED TYPE CLAMPING DEVICE

(75) Inventor: Kenji Nagano, Ibaragi (JP)

(73) Assignee: Kabushiki Kaisha Kenlock, Osaka (JP)

( * ) Notice: Subject to any disclaimer, the term of this patent is extended or adjusted under 35 U.S.C. 154(b) by 91 days.

(21) Appl. No.: 10/863,728

(22) Filed: Jun. 8, 2004

(65) Prior Publication Data

US 2005/0005405 A1    Jan. 13, 2005

(30) Foreign Application Priority Data

Jul. 9, 2003  (JP) .............................. 2003-272349

(51) Int. Cl.
*F16L 33/20* (2006.01)
*F16L 33/04* (2006.01)
(52) U.S. Cl. .................. 24/20 R; 24/20 EE; 24/23 EE
(58) Field of Classification Search ............ 24/20 CW, 24/20 R, 20 EE, 20 S, 20 TT, 20 W, 23 EE; 285/420; 464/173, 175
See application file for complete search history.

(56) References Cited

U.S. PATENT DOCUMENTS

| | | | |
|---|---|---|---|
| 3,833,969 A | 9/1974 | Hollingsworth et al. ... | 24/23 W |
| 4,492,004 A | 1/1985 | Oetiker ....................... | 24/20 R |
| 5,138,746 A | 8/1992 | Ojima et al. ................. | 24/20 R |
| 5,307,541 A * | 5/1994 | Nagano ....................... | 24/20 R |
| 5,375,299 A * | 12/1994 | Nagano ....................... | 24/20 R |
| 5,581,851 A | 12/1996 | Nagano ....................... | 24/20 R |
| 5,797,168 A | 8/1998 | Nagano ....................... | 24/20 R |

FOREIGN PATENT DOCUMENTS

| | | | | |
|---|---|---|---|---|
| EP | 0 828 107 | 3/1998 | ................. | 24/20 R |
| JP | 7-50631 | 11/1995 | ................. | 24/20 R |

\* cited by examiner

*Primary Examiner*—Robert J. Sandy
*Assistant Examiner*—Ruth C. Rodriguez
(74) *Attorney, Agent, or Firm*—Jordan and Hamburg LLP

(57) ABSTRACT

The invention is characterized in that in order to improve tensile strength and draw operability for a two-loop coiled type claming device and to suppress the amount of slack to the minimum necessary, the arrangement is such that when the bore diameter of a clamp band 11 is forcibly contractively deformed by inserting a draw operating tool (F) between first and second tool engaging teeth (18) and (22) cut up outwardly from the inner and outer overlap portions (11*a*) and (11*b*) of the clamp band 11 to engage the tool (F) with the teeth (18) and (22), a first fixing tooth (17) of raised channel shape cut up outwardly from the inner overlap portion (11*a*) and a second fixing tooth (21) of recessed channel shape cut up reversely or inwardly from the outer overlap portion (11*b*) seizure-wise engage each other by a fixed amount (L4) through a tool relief reception communication hole (24) in the intermediate overlap portion (11*c*) interposed therebetween.

6 Claims, 32 Drawing Sheets

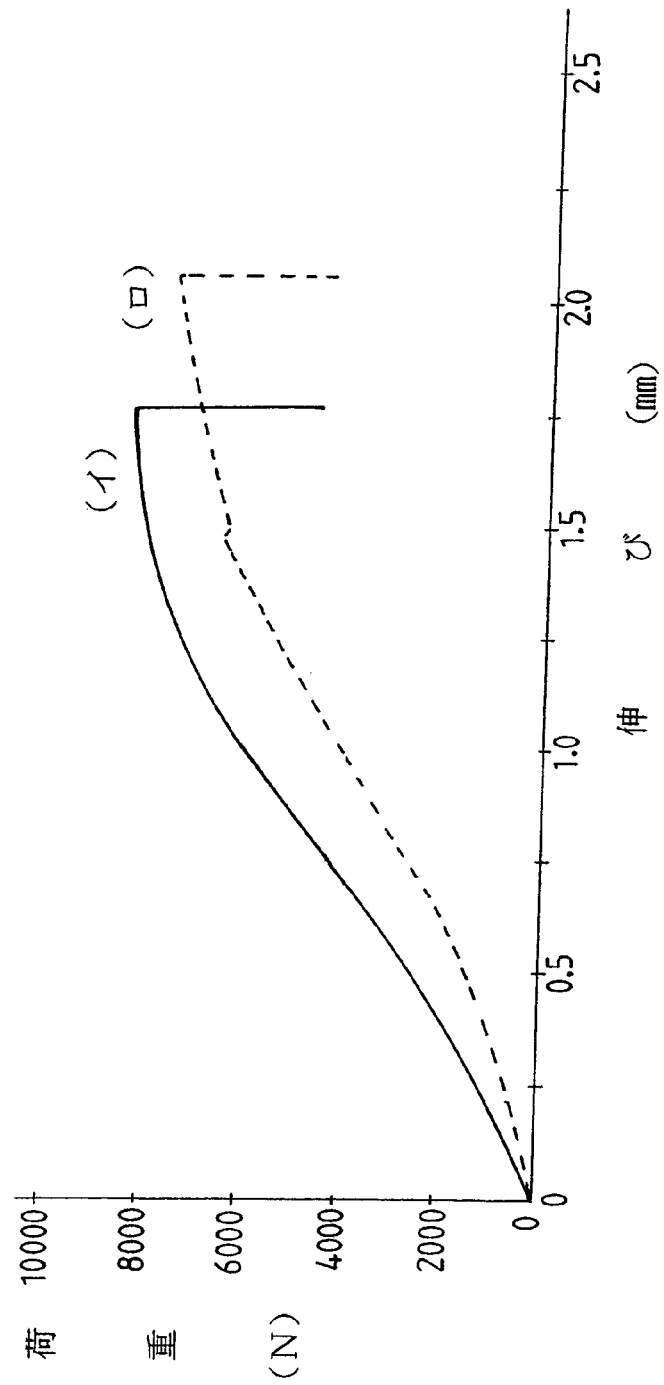

TWO-LOOP COILED TYPE CLAMPING DEVICE

BACKGROUND OF THE INVENTION

The present invention relates to a two-loop coiled type clamping device for semipermanently fasteningly fixing a fluid conveying hose, dustproof bellows, shaft coupling boot or some other article to be fixed made of a plastic material, such as rubber or synthetic resin, to the connecting circumferential surface of optional equipment.

As for this kind of two-loop coiled type clamping device, I have already obtained Japanese Utility Model Publication No. Hei 7-50631 and Japanese Patent Nos. 2898613 and 2947466, which are improved versions thereof, and U.S. Pat. No. 5,797,168, European Patent No. 0828107, Chinese Patent No. ZL 97116269. 7, Korean Patent No. 236726, and Thai Patent No. 11823, with priority claimed on the basis of said two Japanese Patents.

To cite said Japanese Patent No. 2898613 as an representative example, as described in the specification and drawings thereof, a clamp band 11 of metal strip material M of fixed length L is roll-bent for three-dimensionalization in an overall two-loop circular coiled state in which an inner overlap portion 11a which forms one roll-bent end side and an outer overlap portion 11b which forms the other roll-bent end side overlap each other in three layers by a fixed amount L through an intermediate overlap portion 11c.

Therefore, as compared with a clamping device constructed such that it is simply roll-bent for three-dimensionalization as a single circular ring with overlapping taking place only in two layers partially by a fixed amount X (for example, Japanese Patent No. 2652136 and Japanese Utility Mode Publication No. Hei 7-47671 that I have proposed), there are advantages that the bore diameter of the clamp band 11 can be lightly and smoothly contractively deformed with a draw operating force (tightening torque) which is as low as only half and that, furthermore, an article to be fixed 10 can be stably fasteningly fixed to the connecting circumferential surface 32 of optional equipment 31, in a uniform overall surface close contact state, by means of the clamp band 11 which maintains a very high degree of circularity.

Further, in said known inventions, the clamp band 11 has an external contact region X1 and an internal contact region X2 which are held in a two-layer overlap state, and a plurality of float leg pieces 23 which are cut up in an inwardly bent state from an external contact region X1 are elastically contacted with an internal contact region X2 out of the two, the external and internal contact regions X1 and X2, or reversely, a plurality of float leg pieces 23 which are cut up in an outwardly bent state from the internal contact region X2 are elastically contacted with the external contact region X1, thereby causing said clamp band 11 itself to store a diametrical expansion/contraction spring force.

Therefore, even if the article to be fixed 10 is a dustproof bellows or shaft coupling boot made of rigid synthetic resin material, which has originally no elasticity, or even if the article to be fixed 10 is a fluid conveying hose made of elastic rubber material and happens to lose its elasticity due to aging as time passes, the article to be fixed 10 can be fasteningly fixed to the connecting circumferential surface 32 of optional equipment 31, always in a uniform overall surface close contact state, by the action of the clamp band 11 of absorbing changes in the rigidity and thickness of the article to be fixed 10 with said float leg pieces 23 serving as the expansion/contraction spring elements of the clamp band 11. Furthermore, it may be said that keeping the overall flat state provides the advantage of being usable with equipment, such as vehicles subjected to turning forces, vibrations, and shocks, without any trouble.

As the result of my intensive repeated studies, however, it has been found that with the arrangement of said known inventions, by the fixed amount X of intermediate overlap portion 11c in which the inner and outer overlap portion 11a and 11b of the clamp band 11 basically remain in a three-layer overlap state irrespective of the presence or absence of the float leg pieces 23 serving as the expansion/contraction elements of the clamp band 11, a first fixing tooth 18 bent out in an inwardly recessed state from the outer overlap portion 11b and a second fixing tooth 22 bent out in a reverse or outwardly raised state from the intermediate overlap portion 11c seizure-wise engage each other, thereby fasteningly fixing the clamp band 11 in a circular coiled state; since said second fixing tooth 22 is not disposed in the inner overlap portion 11a, the following problems arise.

That is, it is, as it were, the fate of the clamping devices disclosed in said known inventions that when the inner and outer overlap portion 11a and 11b of the clamp band 11 are drawn by a draw type operating tool P, the first and second fixing teeth 18 and 22 once move across each other and after this move-across, they seizure-wise engage each other, such relation resulting in the seizure-wise engaged state (the fasteningly fixed state of the article to be fixed 10) being afterward slacked by an amount corresponding to the spring-back after said move-across.

In this respect, the arrangement of said known inventions is such that the second fixing tooth 22 is bent out in an outwardly raised state from the intermediate overlap portion 11c to seizure-wise engage the first fixing tooth 18 of the outer overlap portion 11b in the first lap of the clamp band 11; therefore, the clamp band 11 is no different in terms of a mechanical fasteningly fixing means for the clamp band 11 from a one-loop clamping device. Thus, in spite of being a two-loop coiled type clamping device, said post-slack still frequently occurs.

Then, if the article to be fixed 10 is a thick-walled fluid conveying hose or the like made of elastic rubber material, it is capable of absorbing said amount of slack by its thick-walled elastic material, whereas if the article to be fixed 10 is a thin-walled protective bellows, shaft coupling boot or the like particularly formed of inelastic rigid synthetic resin material, said amount of slack leads to a fatal defect for the clamping device.

For example, with the amount of seizure engagement of said first and second fixing teeth 18 and 22 being 0.5 mm, suppose mutual move-across by a greater amount of 0.6 mm. Then, the first and second fixing teeth 18 and 22 spring back by an amount of about 0.19 mm in calculation along the circumference of the clamp band 11. The amount of such post-slack of about 0.19 mm is an excessive numerical value for the article to be fixed 10 such as a protective bellows, shaft coupling boot or the like which is usually formed about 1.0–1.5 mm thin-walled from rigid synthetic resin material, with the result that it happens that the stable firm tightened state of the article to be fixed 10 cannot be obtained.

Further, in the case where the clamp band 11 is produced on a multiproduct production basis with the bore diameter varying according to the diameter of the article to be fixed 10, the distance between said first and second fixing teeth 18 and 22 has to be changed. However, since the second fixing tooth 22 is bent out in an outwardly raised state from the intermediate overlap portion 11c of the clamp band 11, the calculation of accurately determining the bending-out process position is very difficult to the extent that even a slight positional deviation makes it impossible to firmly stably tighten the second fixing tooth 22 to the first fixing tooth 18 of the outer overlap portion 11b, in which sense also the clamping device becomes fatally defective, detracting from the economics of multiproduct mass production.

Further, in the case of this kind of a two-loop coiled type clamping device, in comparison with a one-loop type, the inner and outer overlap portions 11a and 11b have to be subjected to an additional drawing operation by an amount corresponding to the clamp band 11 being in two-loop roll-bent three-dimensional form. With the arrangement of said known inventions, however, since the place where the first and second fixing teeth 18 and 22 seizure-wise engage each other is only one place in the clamp band 11, without having no temporarily fixing means, it is necessary to contractively deform the clamp band 11 at one effort until the intended final bore diameter is attained. Such drawing operation can hardly be performed lightly and, moreover, if misengagement should happen, this would cause the clamp band 11 to energetically springingly spread out, involving the danger of hurting the operator.

SUMMARY OF THE INVENTION

The present invention, which is intended to eliminate such various problems, has for its object the provision of a two-loop coiled type clamping device wherein a clamp band made of metal strip material cut to a fixed length is roll-bent for three-dimensionalization in an overall two-loop circular coiled state in which an inner overlap portion which forms one roll-bent end side and an outer overlap portion which forms the other roll-bent end side overlap each other in three layers by a fixed amount through an intermediate overlap portion, the bore diameter of the clamp band is forcibly contractively deformed, thereby fasteningly fixing a fluid conveying hose, dustproof bellows, shaft coupling boot or some other article to be fixed made of plastic material such as rubber or synthetic resin to the connecting circumferential surface of optional equipment, said two-loop coiled type clamping device being characterized in that only one severed end of said inner overlap portion is notched to provide a pilot nose having a fixed width narrower than the fixed width of the metal strip material itself, and a second fixing tooth receiving hole and a first tool receiving hole are distributively formed in side-by-side relation at positions successively spaced away from one severed end side of the inner overlap portion, and then a first fixing tooth of raised channel shape is bent out from the opening edge of the second fixing tooth receiving hole on the side adjacent said pilot nose and a first tool engaging tooth also of raised channel shape is bent out from the opening edge of said first tool receiving hole on the side adjacent the second fixing tooth receiving hole, in a state in which these teeth are each outwardly raised by fixed amounts of height, respectively, and on the other hand, said outer overlap portion has distributively formed therein a first fixing tooth receiving hole and a second tool receiving hole in side-by-side relation, successively spaced away from the other severed end side and then a second fixing tooth of recessed channel shape is bent out in an inwardly recessed state by a fixed amount of depth from the opening edge of the first fixing tooth receiving hole on the other severed end side, and a second tool engaging tooth of raised channel shape is bent out in an outwardly raised state by a fixed amount of height from the opening edge of said second tool receiving hole on the side adjacent the first fixing tooth receiving hole, said intermediate overlap portion has distributively formed therein in side-by-side relation a nose receiving hole for relief-wise receiving the pilot nose of the inner overlap portion and a tool relief reception communication hole for relief-wise receiving said first fixing tooth and first tool engaging tooth of the inner overlap portion, the arrangement is such that when the working teeth of a draw type operating tool are inserted and engaged between first and second tool engaging teeth, standing upright in side-by-side relation, of said inner and outer overlap portions, respectively, so as to draw the pair of working teeth toward each other, thereby forcibly contractively deforming the bore diameter of said clamp band, the first and second fixing teeth of the inner and outer overlap portions, respectively, seizure-wise engage each other by a fixed amount through the tool relief reception communication hole in the intermediate overlap portion existing therebetween.

According to the above arrangement specifically described in claim 1 of the present invention, the first fixing tooth forming a mechanical fasteningly fixing means of the clamp band is bent out in raised channel shape in an outwardly raised state from the inner overlap portion and is adapted to seizure-wise engage the second fixing tooth bent out in recessed channel shape in an inwardly recessed state from the outer overlap portion, by a fixed amount through the tool relief reception communication hole in the intermediate overlap portion. Therefore, even if the first and second fixing teeth spring back after move-across, the amount of post-slack can be limited to the minimum necessary, bringing the superior tensile strength into play.

As a result, the two-loop coiled type clamping device of the present invention can be widely applied to various articles to be fixed without any constraint, having an advantage that even if the article to be fixed is a dustproof bellows, shaft coupling boot or the like, for example, formed of inelastic rigid synthetic resin material to have about 1.0–1.5 mm thin wall, it can be stably firmly tightened without the danger of slacking.

Further, said first fixing tooth of the invention is bent out in an outwardly raised state from one severed end side of the inner overlap portion of the clamp band; therefore, in multiproduct production of clamping devices varying in bore diameter, the distance between said first and second fixing teeth can be adjusted very easily and accurately in the same manner as in, as it were, a one-loop clamping device, and no difficulty is posed in the calculation of determining the first and second fixing tooth bending-out process positions, resulting in the superiority of the economics of multiproduct mass production.

Particularly, if the arrangement described in claim 2 of the present invention is employed, the first and second fixing teeth of said inner and outer overlap portions, respectively, can be kept in a state in which they seizure-wise engage each other in a plane substantially bisecting the fixed thickness of the intermediate overlap portion, within the tool relief reception communication hole formed in the intermediate overlap portion, whereby the inner and outer overlap portions are spontaneously drawn into contact with the intermediate overlap portion, having the advantage of providing a fastened state having high degrees of overall flatness and circularity of the clamp band.

If the arrangement described in claim 3 of the present invention is employed, the arrangement will be such that when the first and second fixing teeth seizure-wise engage each other by a fixed amount for the clamp band to be fasteningly fixed at the final bore diameter of the clamp band, the prop-up key of the intermediate overlap portion is stopped by the prop-up key stop edge of the inner overlap portion; therefore, the prop-up restrain action of the prop-up key can lock the engaged sate of the first and second fixing teeth more stably, eliminating the danger of accidental unlocking.

If the arrangement described in claim 4 of the present invention is employed, in the process of drawing the bore diameter of the clamp band by an operating tool, the second fixing tooth of the outer overlap portion can be once seizure-wise engaged with the second fixing tooth temporarily fixing edge of the intermediate overlap portion in a temporarily fixed state. The amount of draw from the intermediate bore diameter in the temporarily fixed state to the intended final bore diameter is always constant; therefore, there is an advantage that the draw operation can be smoothly conveniently performed even if the clamping device is a two-loop coiled type clamping device requiring a large amount of draw as compared with a one-loop clamping device.

Further, if the arrangement described in claim 5 of the present invention is employed, a plurality of float leg pieces interposed between the external and internal contact regions of the clamp band are used as expansion/contraction spring elements, and changes in the thickness or hardness of the article to be fixed can be spontaneously elastically absorbed or adjusted, a fact which is useful for adaptability to various articles to be fixed and for securement of overall close contact state.

Other objects and effects will be spontaneously become clear from the detailed description of preferred embodiments of the present invention to be later given.

BRIEF DESCRIPTION OF THE DRAWINGS

FIG. 34 is a load-elongation graph showing the result of a comparative test between the present invention and a known invention.

DETAILED DESCRIPTION OF THE PREFERRED EMBODIMENTS

Figure 1:
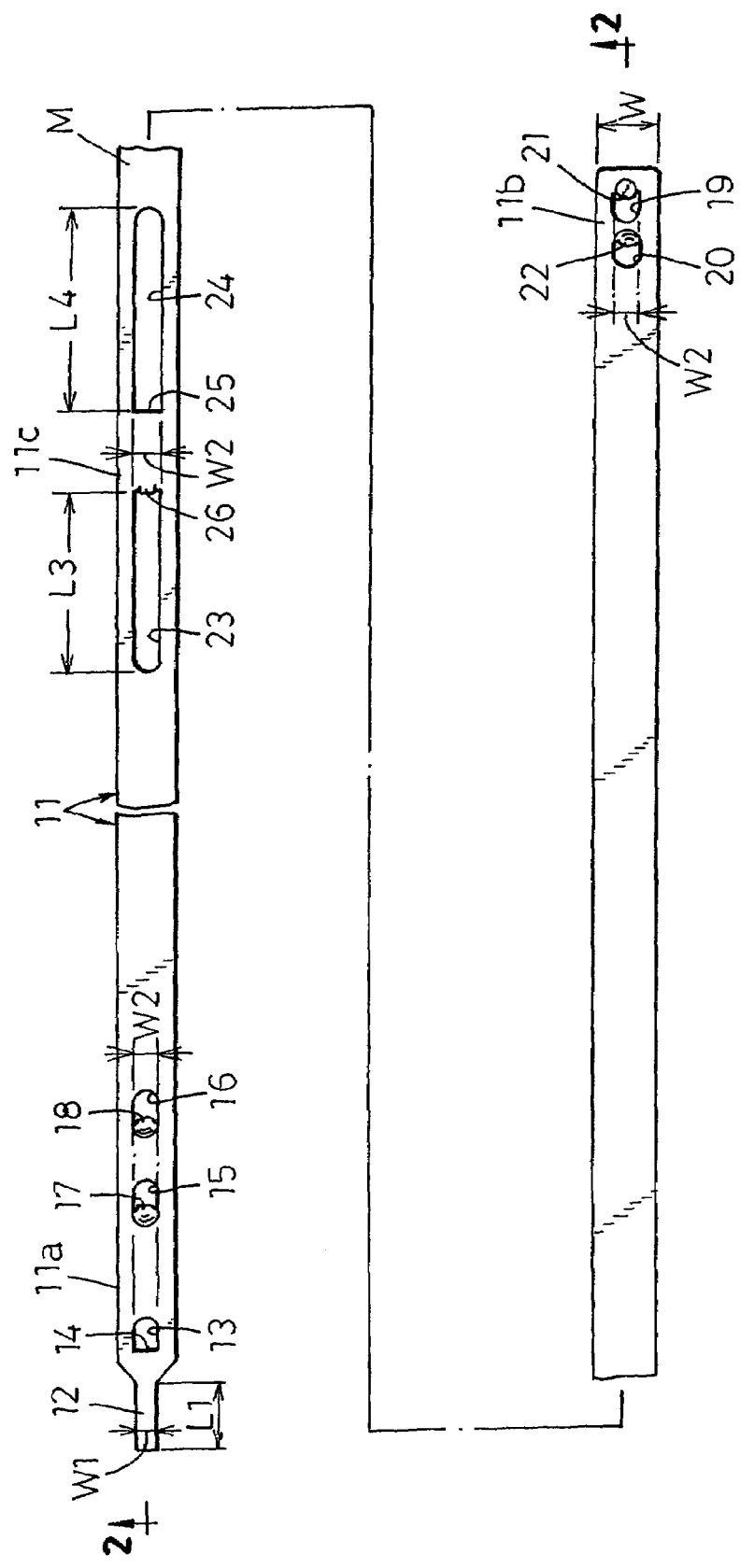
FIG. 1 is a fragmentary plan view showing the developed planar state of a claming device according to a first embodiment of the invention.
Figure 2:
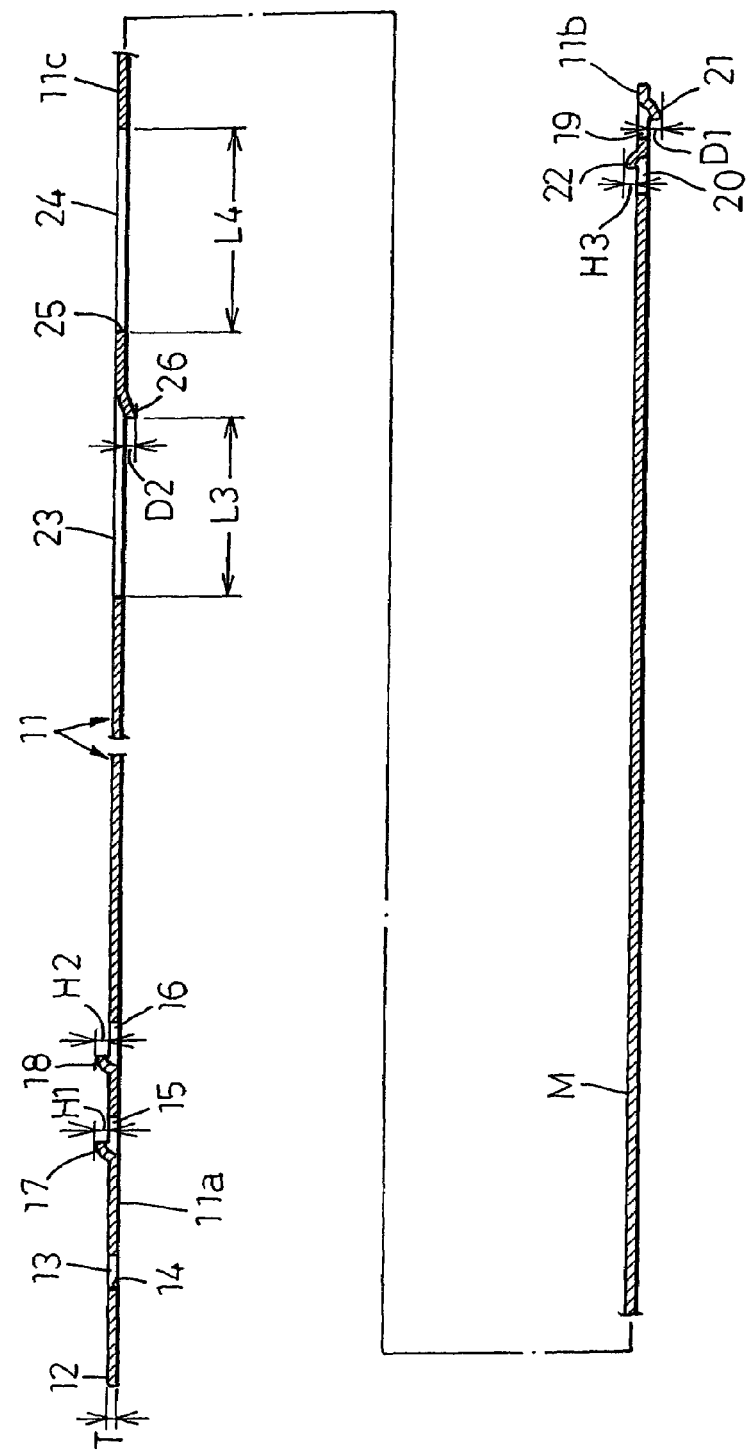
FIG. 2 is a sectional view taken along the line 2—2 in FIG. 1.

The concrete arrangement of the present invention will now be described in detail with reference to the drawings. FIGS. 1 and 2 show a developed planar state (a material working state) of a clamping device according to a first embodiment of the invention, and FIGS. 3 through 12 show a roll-bent three-dimensionalized product (a clamping device with a bore diameter of about 35 mm, in the illustrated example) and a usage state thereof.

As a material for the clamping device, use is made of stainless steel sheet of SUS 301, 304 316 or 430 (SUS 316, in the illustrated example) or some other metal strip M having a fixed thickness T of about 0.5–1.0 mm (0.5 mm, in the illustrated example) and a fixed width W of about 7–10 mm (9 mm, in the illustrated example), such beforehand-prepared long-sized material being cut into lengths having a fixed length L (250 mm, in the illustrated example) suited to the thickness of an intended article to be fixed 10, such as a liquid conveying hose, dustproof bellows, shaft coupling boot or the like.

The numeral 11 denotes a clamp band made of said metal strip material M cut to a fixed length which is then roll-bent in two loops for three-dimensionalization in the form of a circular ring as seen in front view, contributing, as it were, directly to the tightening action on the article to be fixed 10, it being held in a partial three-layer overlap state by a fixed amount X (about 27 mm, in the illustrated example) such that the other roll-bent end side indirectly externally contacts the one roll-bent end side.

That is, the clamp band 11 with one roll-bent end side forming an inner overlap portion 11a and the other roll-bent end side forming an outer overlap portion 11b is roll-bent in an overall two-loop circular coiled state for three-dimensionalization such that it overlaps in three layers by the fixed amount X in an intermediate position.

Figure 7:
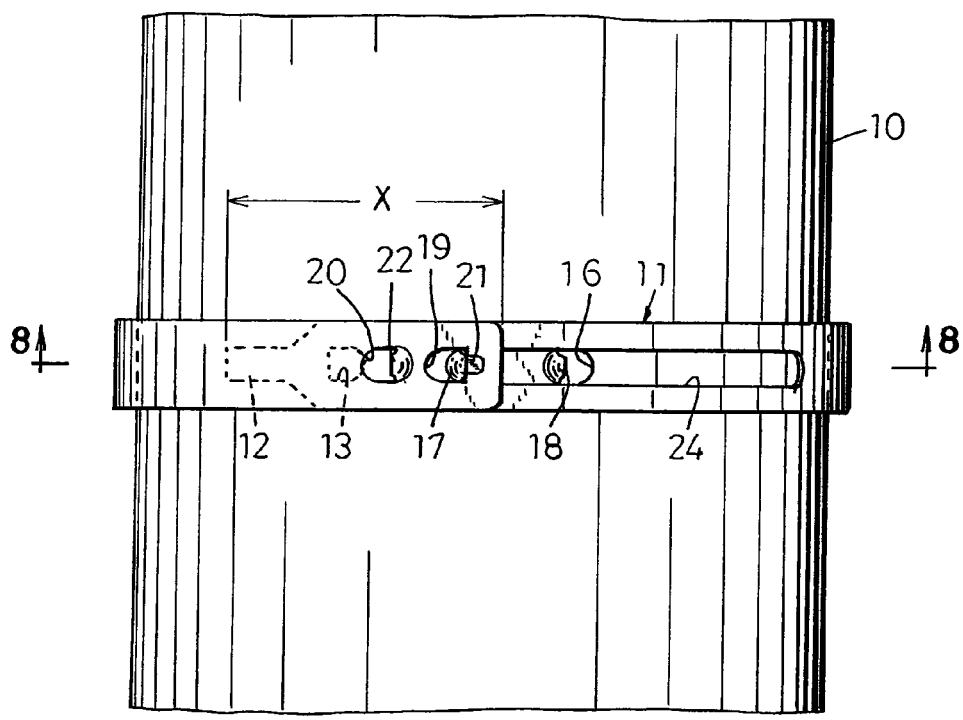
FIG. 7 is a partial enlarged plan view of FIG. 6.
Figure 8:
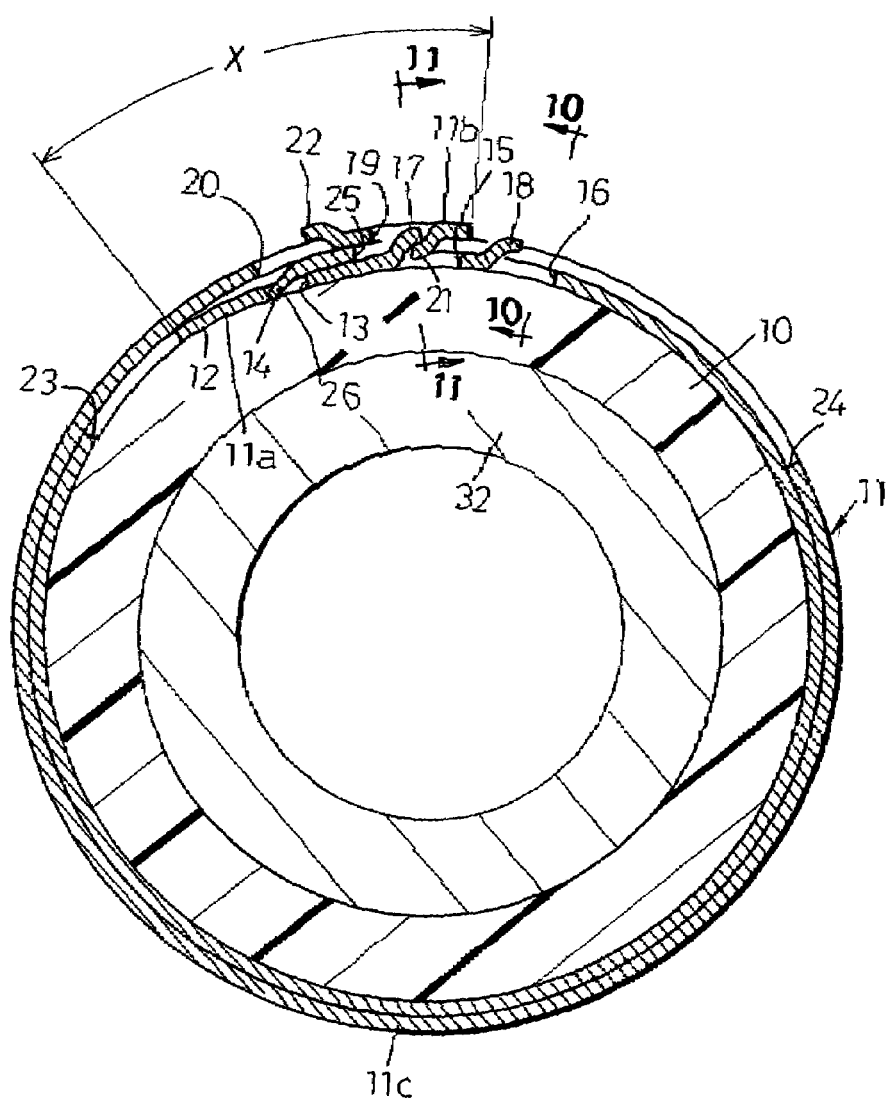
FIG. 8 is an enlarged sectional view taken along the line 8—8 in FIG. 7.
Figure 9:
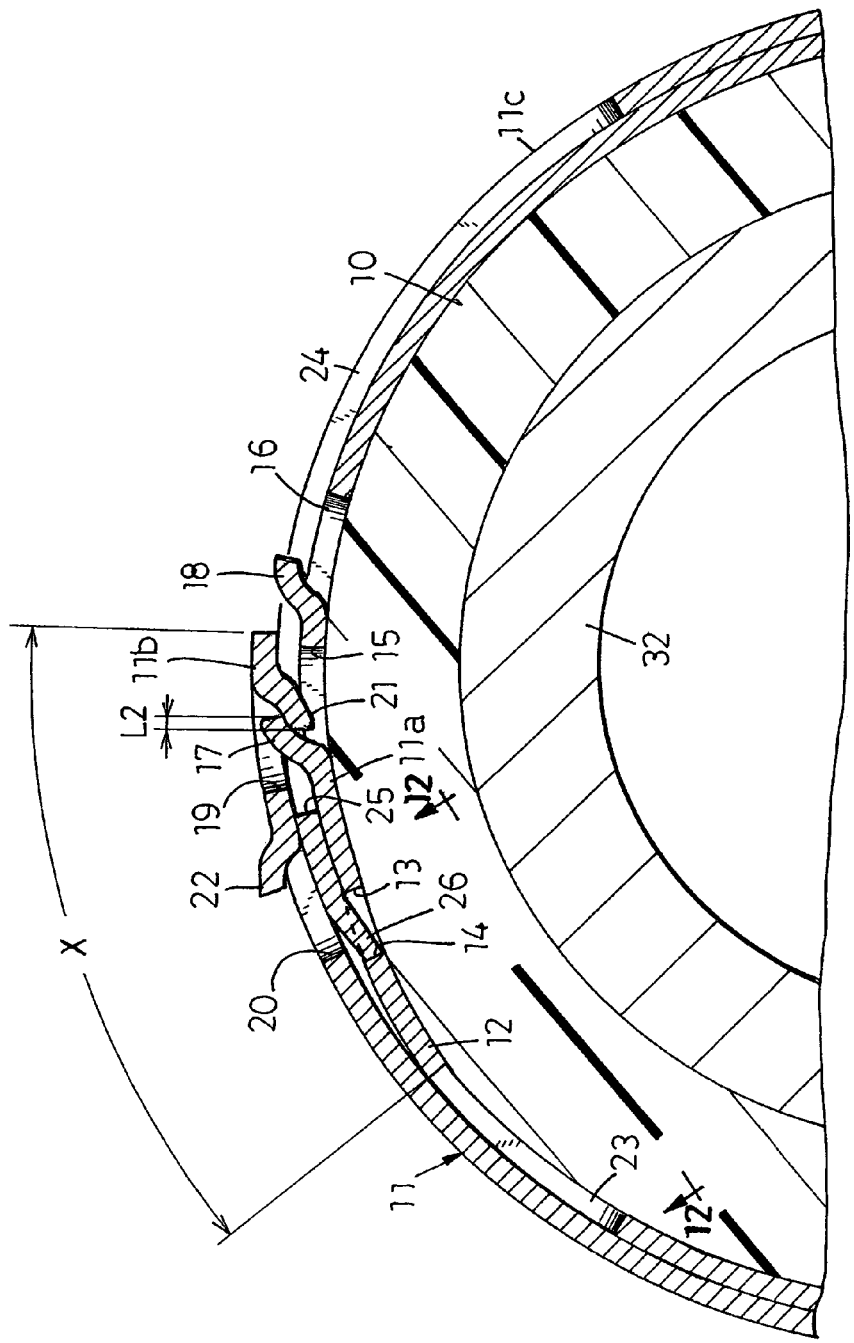
FIG. 9 is an enlarged sectional view of a portion of FIG. 8.
Figure 10:
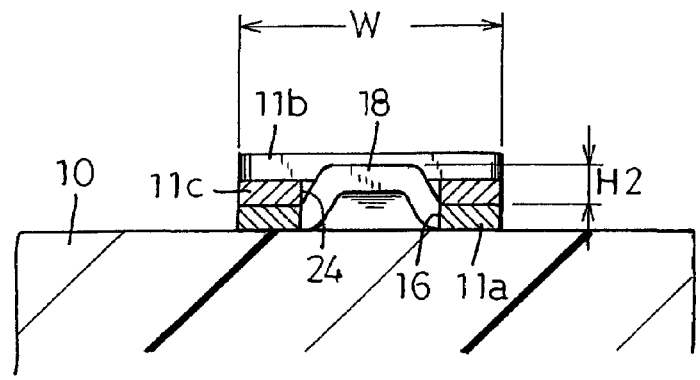
FIG. 10 is an enlarged sectional view taken along the line 10—10 in FIG. 8.

The character 11c denotes an intermediate overlap portion interposed between said inner and outer overlap portions 11a and 11b in said three-layer overlap region by the fixed amount X. As said intermediate overlap portion 11c, as shown in FIGS. 7–9, continues from said three-layer overlap region by the fixed amount X to one roll-bent end side of the clamp band 11, it assumes a two-layer overlap state internally contacting said outer overlap portion 11b and, as it continues from said three-layer overlap region to the other opposite roll-bent end side of the clamp band 11, it assumes a two-layer overlap state externally contacting said inner overlap portion 11a.

Said clamp band 11 has, of course, the fixed width W of the metal strip material M itself, but one severed end alone of the inner overlap portion 11a is formed as a pilot nose 12 having a small fixed width W1 (3 mm, in the illustrated example) which is less than about a third of the fixed width W of the clamp band 11 by symmetrically notching the opposite side edges of the metal strip material M. The extending length L1 of the pilot nose 12 is dimensioned to be about 7–10 mm (7 mm, in the illustrated example).

The numeral 13 denotes a roll-bending formation engaging pin receiving hole formed in the internal overlap portion 11a of the clamp band 11 and disposed in the vicinity of the extending proximal end of said pilot nose 12, said hole 13 being adapted to receive an engaging pin extending upright from the circumferential surface of a clamp band roll-bending formation mandrel roll in a forming machine (not shown), said hole 13 being used in a state of engagement with the engaging pin to roll-bend said clamp band 11 in a circular coiled state for three-dimensionalization in that said mandrel roll is driven for rotation.

Figure 3:
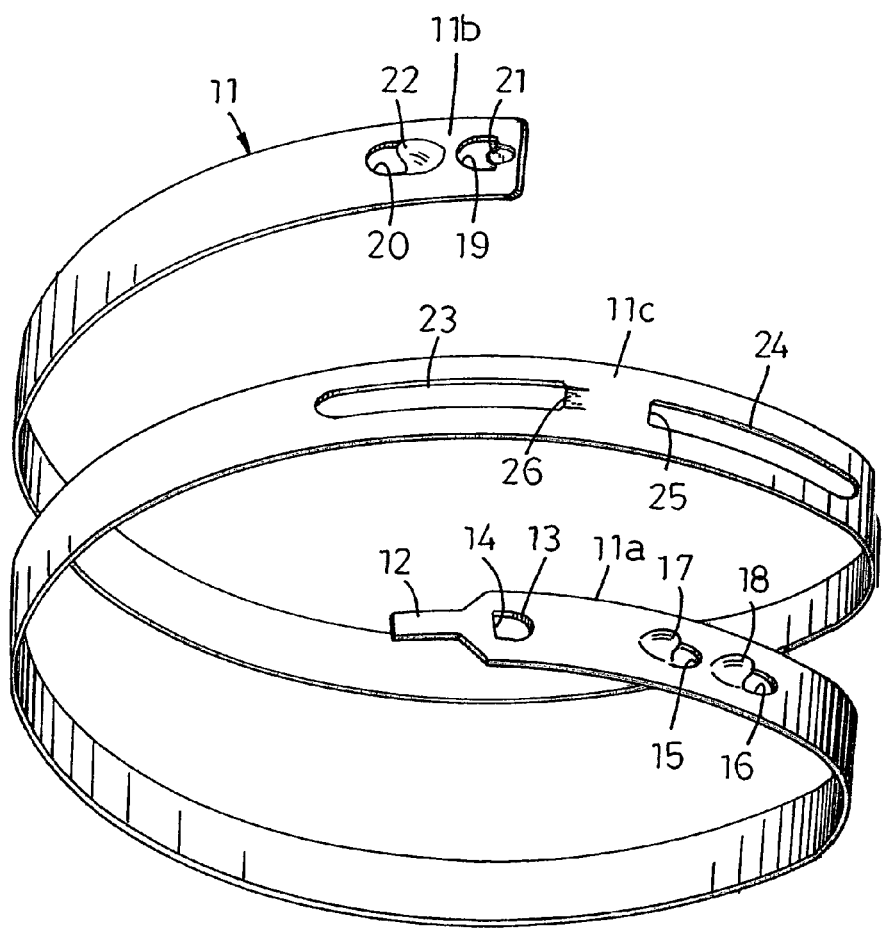
FIG. 3 is a perspective view showing the product of FIG. 1, which is roll-bent for three-dimensionalization.

In that case, said engaging pin receiving hole 13 may be formed circular or elliptic as seen in plan view, and it is preferable that the arrangement be such that particularly with the opening edge thereof on the side adjacent the pilot nose 12 used as a prop-up key stopping edge 14 of straight line segment orthogonal to the longitudinal centerline of the clamp band 11, the engaging pin receiving hole 13, as shown in FIGS. 1–3, is punched out in elongated semicircular or quadrangular form as seen in plan view, thereby stably stopping a prop-up key of the intermediate overlap portion 11c, as will be later described.

Similarly, at positions successively spaced away from the one severed end side of the inner overlap portion 11a in the clamp band 11 more than said engaging pin receiving hole 13, a second fixing tooth receiving hole 15 and a first tool receiving hole 16 are distributively formed in side-by-side relation.

Figure 11:
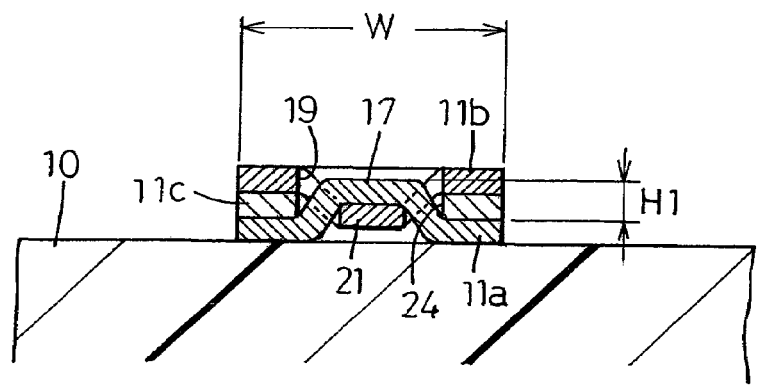
FIG. 11 is an enlarged sectional view taken along the line 11—11 in FIG. 8.
Figure 12:
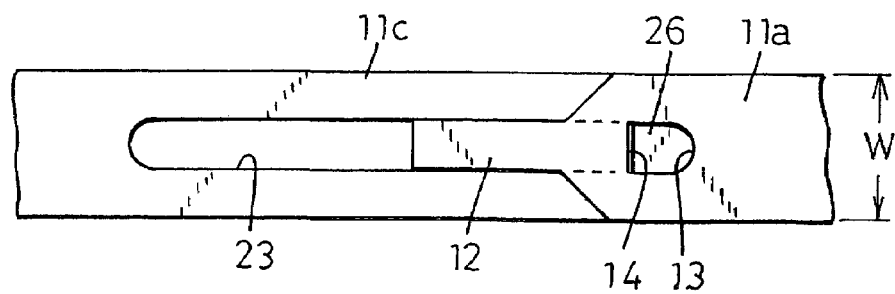
FIG. 12 is a partial bottom view taken along the line 12—12 in FIG. 9.

Here, the second fixing tooth receiving hole 15 and the first tool receiving hole 16 are each elliptic as seen in plan view, lying on the longitudinal centerline of the clamp band 11, whereas the opening edge of said second fixing tooth receiving hole 15 on the side adjacent said engaging pin receiving hole 13 is bent out in an outwardly raised state by a fixed amount of height H1 (about 1 mm, in the illustrated example) corresponding to about 1.5–2.0 times the fixed thickness T of the metal strip material M to form a first fixing tooth 17 of raised channel shape in cross section, as shown in FIGS. 8, 9 and 11.

Further, the opening edge of said first tooth receiving hole 16 on the side adjacent said second fixing tooth receiving hole 15 is bent out as a first tool engaging tooth 18 in an outwardly raised state by a fixed amount of height H2 (about 1.2 mm, in the illustrated example) corresponding to about 1.5–2.5 times the fixed thickness T of the metal strip material M to form a first tool engaging tooth 18 of raised channel shape in cross section, as shown in 8–10, so as to function as a reinforcing bead capable of counteracting a drawing force (a clamp band bore diameter contracting force) exerted by a draw type operating tool F to be later described.

On the other hand, the outer overlap portion 11b of the clamp band 11 which is to come in external contact with said inner overlap portion 11a in a three-layer overlap state is formed with a first fixing tooth receiving hole 19 and a second tool receiving hole 20 also in side-by-side relation, successively spaced away from the other severed end side.

Such first fixing tooth receiving hole 19 and second tool receiving hole 20 are elliptic as seen in plan view. The opening edge of the first fixing tooth receiving hole 19 on the other severed end side is bent out in an inwardly recessed state by a fixed amount of depth D1 (about 1 mm, in the illustrated example) corresponding to about 1.5–2.0 times the fixed thickness T of the metal strip material M to form a second fixing tooth 21 of recessed channel shape in cross section, as shown in FIGS. 8, 9 and 11.

That is, said first fixing tooth 17 of raised channel shape bent out in an outwardly raised state from the inner overlap portion 11a of the clamp band 11 and the second fixing tooth 21 of recessed channel shape bent out in an inwardly recessed state from the outer overlap portion 11b constitute a mechanical fastening means for the clamp band 11, the arrangement being such that the teeth, which are in opposed male and female relation, seizure-wise engage each other in an overlap state by a fixed amount L2 (about 0.5 mm, in the illustrated example) through a tool relief reception communication hole in the intermediate overlap portion 11c to be later described.

Further, the opening edge of the second tool receiving hole 20 on the side adjacent said first fixing tooth receiving hole 19 is bent out also in an outwardly raised state by a fixed amount of height H3 about 1 mm, in the illustrated example) corresponding to about 1.5–2.0 times the fixed thickness T of the metal strip material M to form a second tool engaging tooth 22 of raised channel shape standing side by side with the first tool engaging tooth 18 of said inner overlap portion 11a, as shown in FIGS. 8 and 9, said second tool engaging tooth 22 functioning as a reinforcing bead for the same purpose as that of said first tool engaging tooth 18.

The numeral 23 denotes a nose receiving hole which is formed elongated in the intermediate overlap portion 11c existing in the region where the inner and outer overlap portions 11a and 11b overlap in three layers by a fixed amount X, in such a manner as to assume an elliptic shape as seen in plan view, lying on the longitudinal centerline of the clamp band 11, said hole 23 relief-wise receiving the pilot nose 12 of said inner overlap portion 11a, thereby maintaining the inner peripheral surface (tightening surface) of the clamp band 11 in a flush smooth state. The character L3 denotes the opening length (which is 20 mm, in the illustrated example) of the nose receiving hole 23, said opening length being dimensioned to be much greater than the extending length L1 of said pilot nose 12.

Further, the intermediate overlap portion 11c disposed nearer to the side where the outer overlap portion 11b exists as seen from said nose receiving hole 23 is formed with a tool relief reception communication hole 24 which is in side-by-side relation to the nose receiving hole 23 and which is of elongated elliptic shape as seen in plan view, said communication hole 24 communicating with the second fixing tooth receiving hole 15 and first tool receiving hole 16 in said inner overlap portion 11a, thereby relief-wise receiving said first fixing tooth 17 and first tool engaging tooth 18 in the communication hole 24. The character L4 denotes the opening length of the tool relief reception communication hole 24, said opening length being dimensioned to be 30 mm in the illustrated example.

Therefore, there is no danger that during draw operation of the clamp band 11 by means of an operating tool F to be later described, the intermediate overlap portion 11c and the inner overlap portion 11a which internally contacts the same in a two-layer overlap state may undergo positional deviation free movement, relatively transversely (axially of the article to be fixed).

In addition, said engaging pin receiving hole 13, said first and second fixing tooth receiving holes 19 and 15, said first and second tool receiving holes 16 and 20, said nose receiving hole 23 and said tool relief reception communication hole 24 all have substantially the same opening width W2 (4 mm, in the illustrated example), which is dimensioned to have a little more than a third of the fixed width W of the clamp band 11.

According to the above arrangement, since the first tool engaging tooth 18 of raised channel shape is bent out in an outwardly raised state to have the fixed height H2 which is about 1.5–2.5 times the fixed thickness T of the metal strip material M, from the inner overlap portion 11a of the clamp band 11 through the tool relief reception communication hole 24 in the intermediate overlap portion 11c, the working teeth of the draw type operating tool F to be later described can be reliably and stably inserted and engaged between the first tool engaging tooth 18 and the second tool engaging tooth 22, standing upright in side-by-side relation, of raised channel shape bent out also in an outwardly raised state from the outer overlap portion 11b of the clamp band 11.

And upon draw operation of the clamp band 11, the first fixing tooth 17 of raised channel shape bent out in an outwardly raised state from said inner overlap portion 11a and the second fixing tooth 21 of recessed channel shape bent out in an inwardly recessed state from said outer overlap portion 11b seizure-wise engage each other by the fixed amount L2 through the tool relief reception communication hole 24 in said intermediate overlap portion 11c, whereby the inner and outer overlap portions 11a and 11b are mechanically fastened as a unit.

Further, the pilot nose 12 of the inner overlap portion 11a internally contacting the intermediate overlap portion 11c of said clamp band 11 comes to be relief-wise received in the nose receiving hole 23 in the intermediate overlap portion 11c, and besides this, said first fixing tooth 17 and first tool engaging tooth 18 bent out in an outwardly raised state from the inner overlap portion 11a come to be relief-wise received in the tool relief reception communication hole 24 in said intermediate overlap portion 11c, with the result that even if the clamping device is a two-loop coiled type clamping device, it can be wholly greatly flattened and the inner peripheral surface (tightening surface) of the clamp band 11 can be maintained in a high degree of circularity ring state and in a flush smooth state.

Previously, an explanation has been give to the effect that the nose receiving hole 23 and the tool relief reception communicated hole 24 in the intermediate overlap portion 11c are formed to be of elongated elliptic shape as seen in plan view. It is preferable that the opening edge of said tool relief reception communication hole 24 on the side adjacent the nose receiving hole 23, like the prop-up key stopping edge 14 of said engaging pin receiving hole 13, be punched out particularly as a second fixing tooth temporarily fixing edge 25 of straight line segment orthogonal to the longitudinal centerline of the clamp band 11.

Then, since the second fixing tooth 21 of recessed channel shape bent out in an inwardly recessed state from the outer overlap portion 11b of the clamp band 11 comes to be relief-wise received in the tool relief reception communication hole 24 in the intermediate overlap portion 11c, as described above, it is possible to cause said second fixing tooth 21 to once seizure-wise engage, in a temporarily fixing state, the second fixing tooth temporarily fixing edge 25 of the communication hole 24, and in the process of draw operation of the clamp band 11 by the operating tool F, the clamp band 11 can be maintained in a temporarily fixed state at an intermediate stage where the intended final bore diameter has not yet been reached.

Further, continuing the draw operation while making always constant the amount of draw extending from the intermediate bore diameter in the temporarily fixed state until the intended final bore diameter results in causing the first and second fixing teeth 17 and 21 of the inner and outer overlap portions 11a and 11b, respectively, to seizure-wise engage each other, whereby the final bore diameter of the clamp band 11 can be easily and conveniently obtained.

Further, the opening edge of said nose receiving hole 23 on the side adjacent the tool relief reception communication hole 24 is bent out in an obliquely inwardly recessed state by a fixed amount of depth D2 (0.5 mm, in the illustrated example) substantially corresponding to the fixed thickness T of the metal strip material M to serve as a prop-up key 26 which is in such a positional relation as to be capable of seizure-wise engage the prop-up key stopping edge 14 of the engaging pin receiving hole 13 formed in the inner overlap portion 11a; thus, it is desirable that the arrangement be such that when the first and second fixing teeth 17 and 21 of the inner and outer overlap portions 11a and 11b, respectively, seizure-wise engage each other and the clamp band 11 is fasteningly fixed at the final bore diameter, the prop-up key 26 of said intermediate overlap portion 11c is stopped by the prop-up key stopping edge 14 of the inner overlap portion 11a.

By so doing, the prop-up restrain action of the prop-up key 26 enables the seizure engagement state of said first and second fixing teeth 17 and 21 to be locked against accidental unlocking, further improving reliability and draw operation safety as a claming device.

Such the two-loop coiled type claming device of the invention can be mass-produced from said stainless steel sheet or metal strip material M, as follows.

Figure 14:
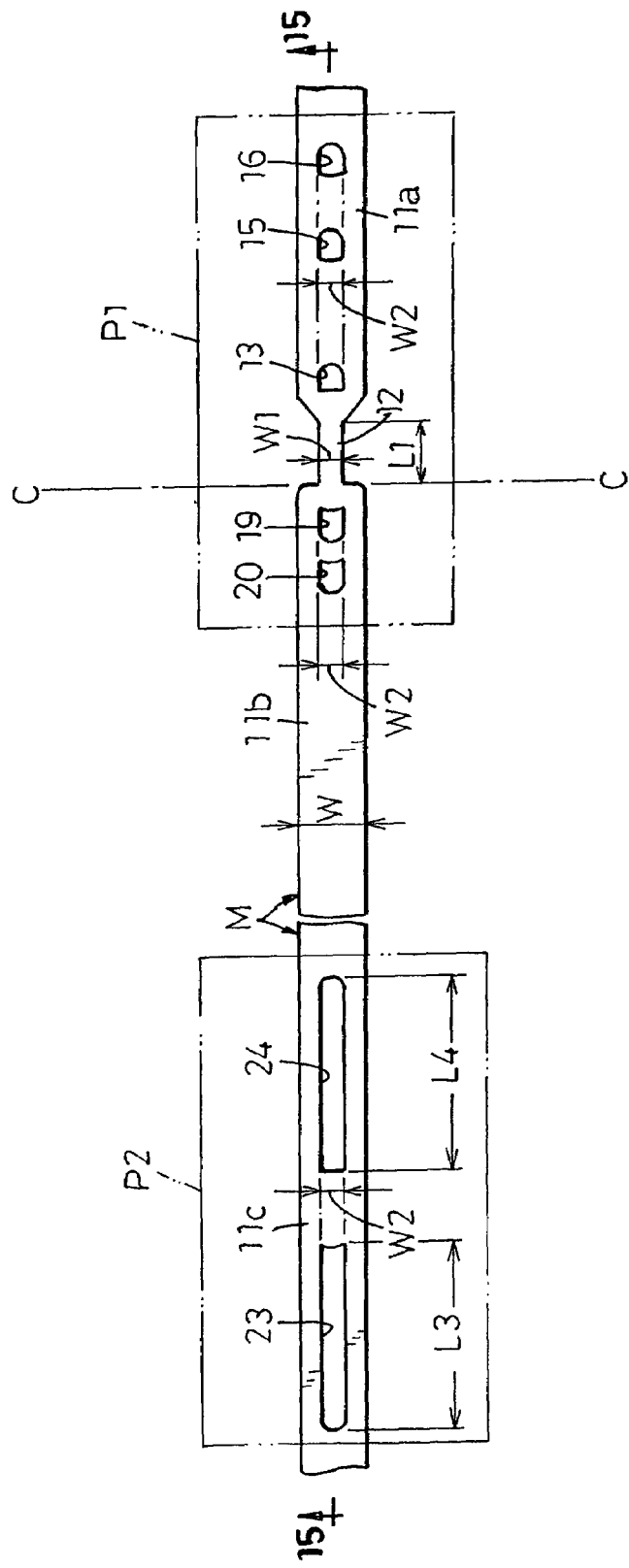
FIG. 14 is an enlarged plan view of a portion of FIG. 13.
Figure 15:
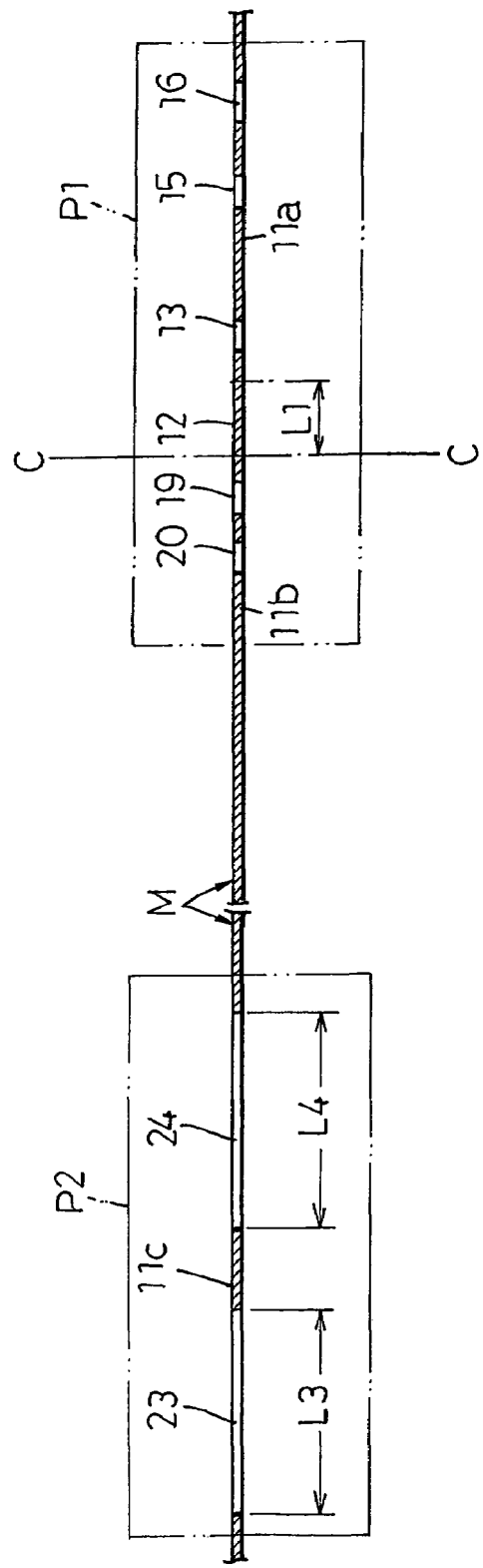
FIG. 15 is a sectional view taken along the line 15—15 in FIG. 14.

That is, in the process of automatic intermittent successive feeding of a beforehand-prepared long-sized metal strip material M in one direction along a transfer line, a punching-out process is performed by using a first press punching-out die P1 to form the pilot nose 12, engaging pin receiving hole 13, first and second tooth receiving holes 15 and 19, and first and second tool receiving holes 16 and 20 in the clamp band 11, and by using a second press punching-out die P2 to form the nose receiving hole 23 and tool relief reception communication hole 24 in the clamp band 11. The punching-out process state using the two types of first and second press punching-out dies P1 and P2 is as shown in FIGS. 13–15.

Figure 16:
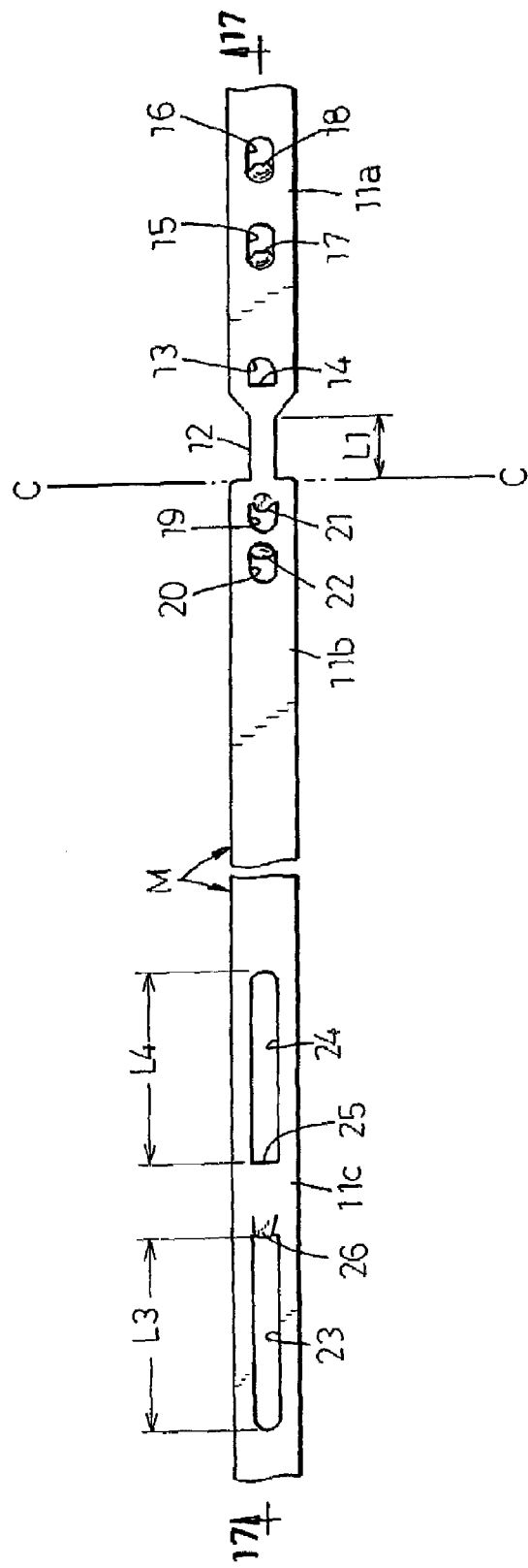
FIG. 16 is an enlarged plan view corresponding to FIG. 14, showing a clamping device bending-up process state which follows punching out.
Figure 17:
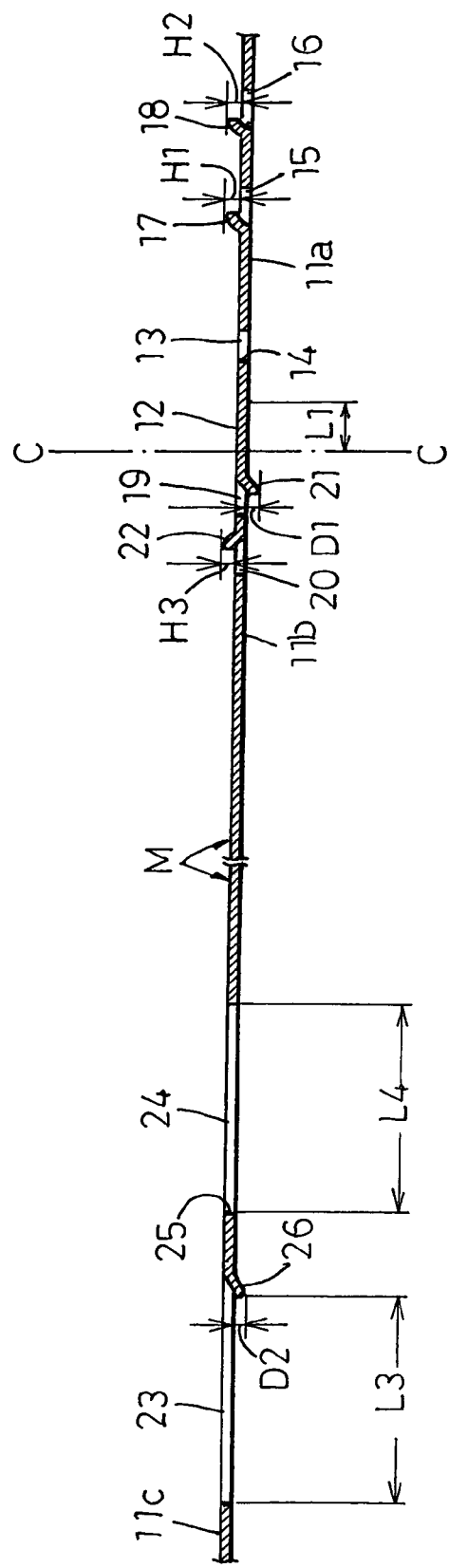
FIG. 17 is a sectional view taken along the line 17—17 in FIG. 16.
Figure 18:
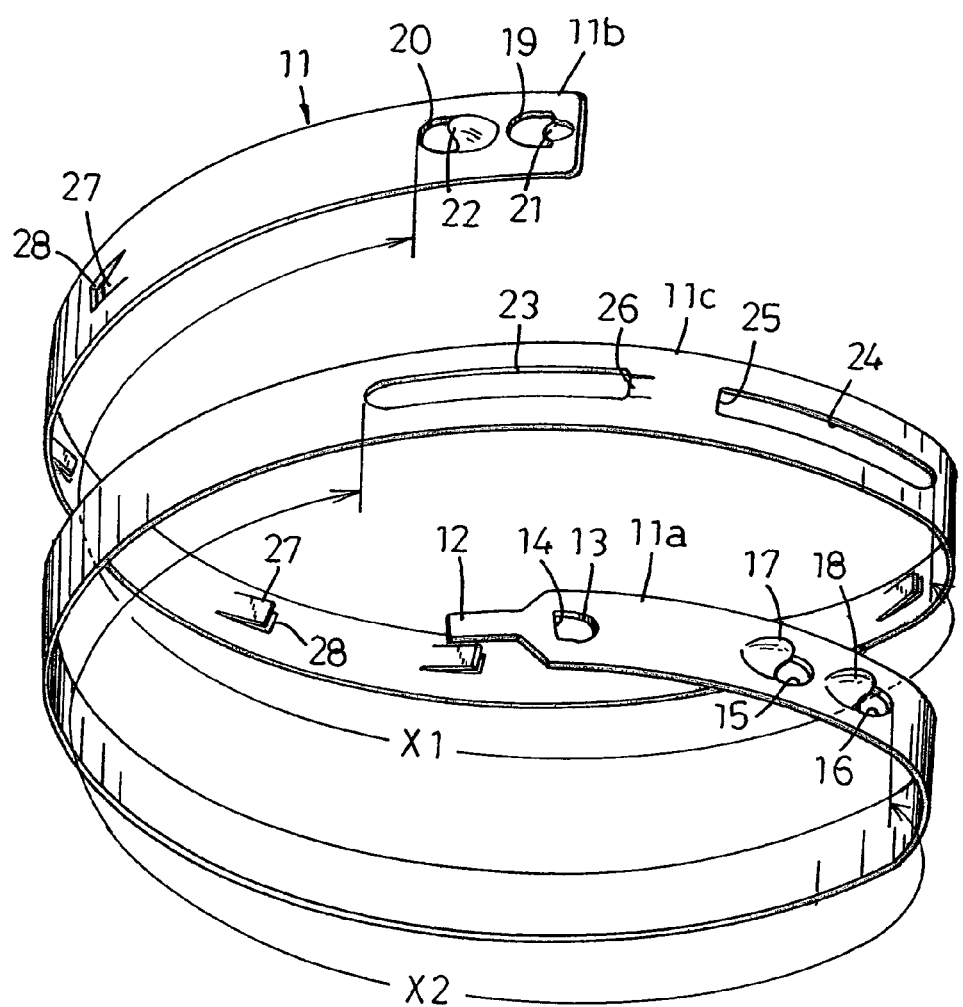
FIG. 18 is a perspective view corresponding to FIG. 3, showing a second embodiment of the invention.
Figure 19:
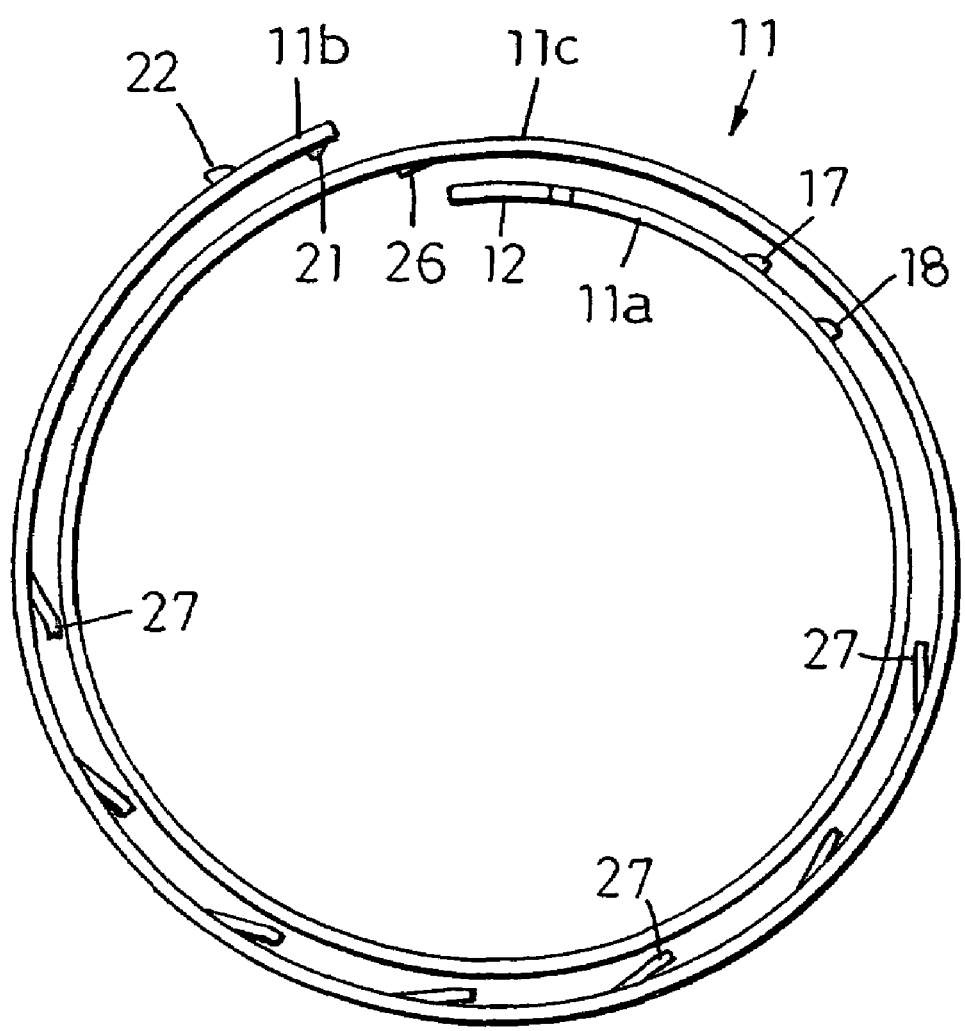
FIG. 19 is a front view of FIG. 18.
Figure 20:
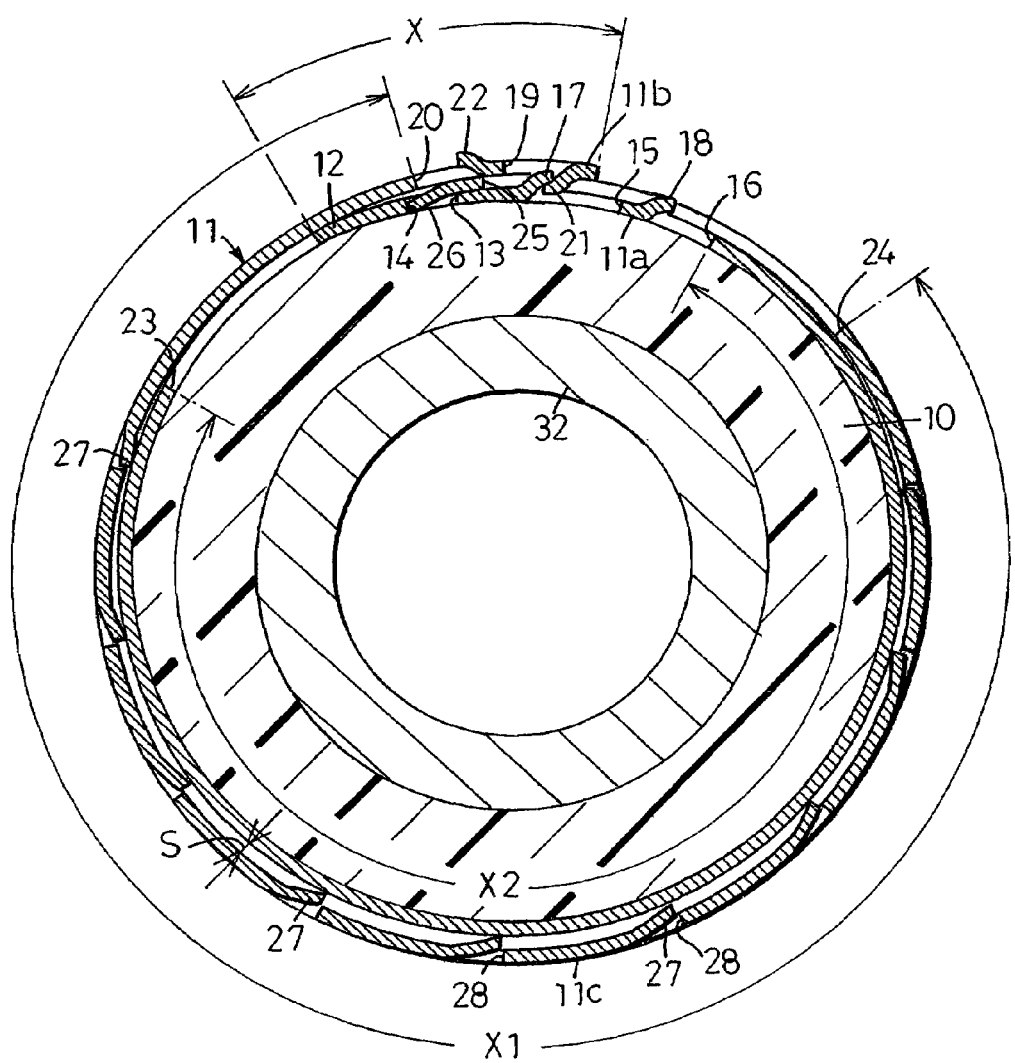
FIG. 20 is a sectional view showing a usage state of FIG. 18.
Figure 21:
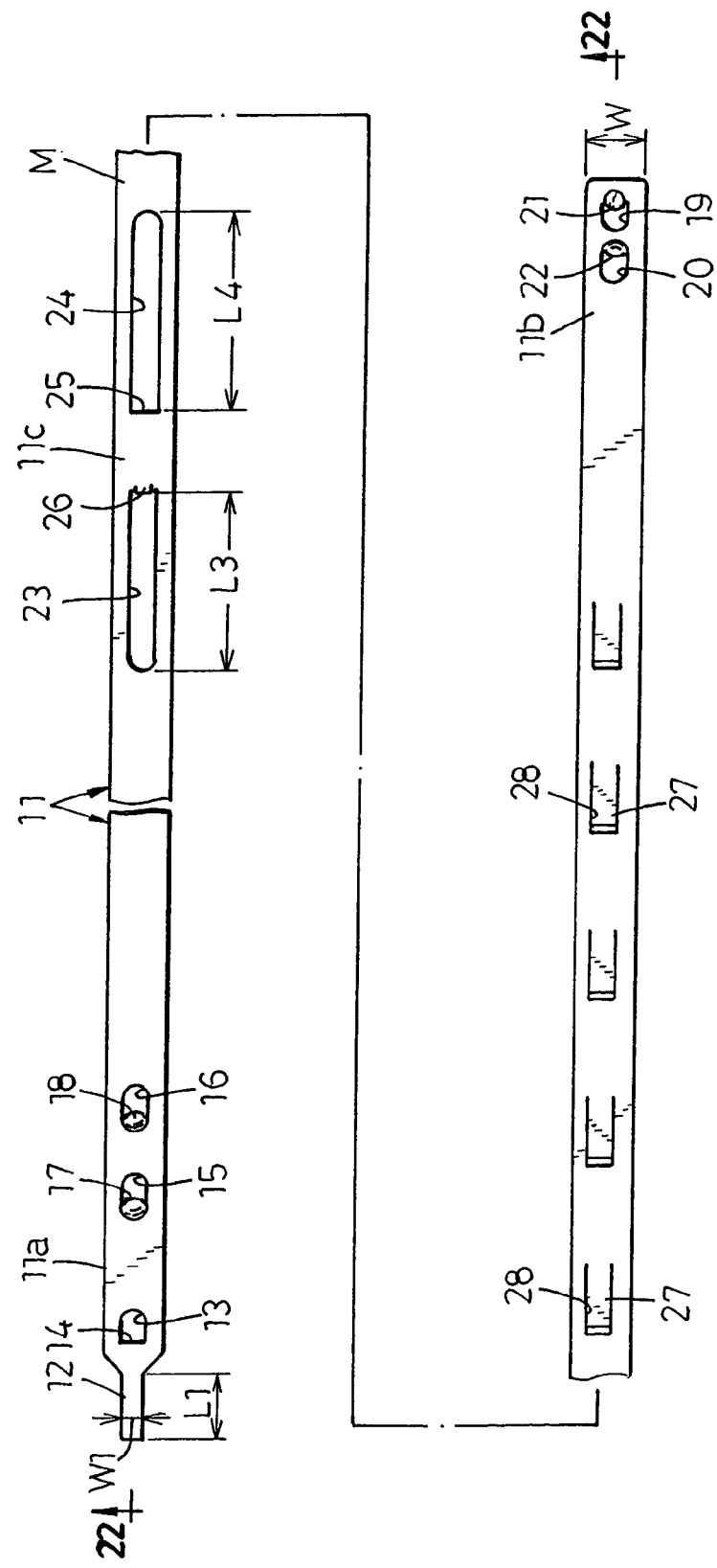
FIG. 21 is a fragmentary plan view corresponding to FIG. 1, showing the second embodiment in a developed planar state.
Figure 22:
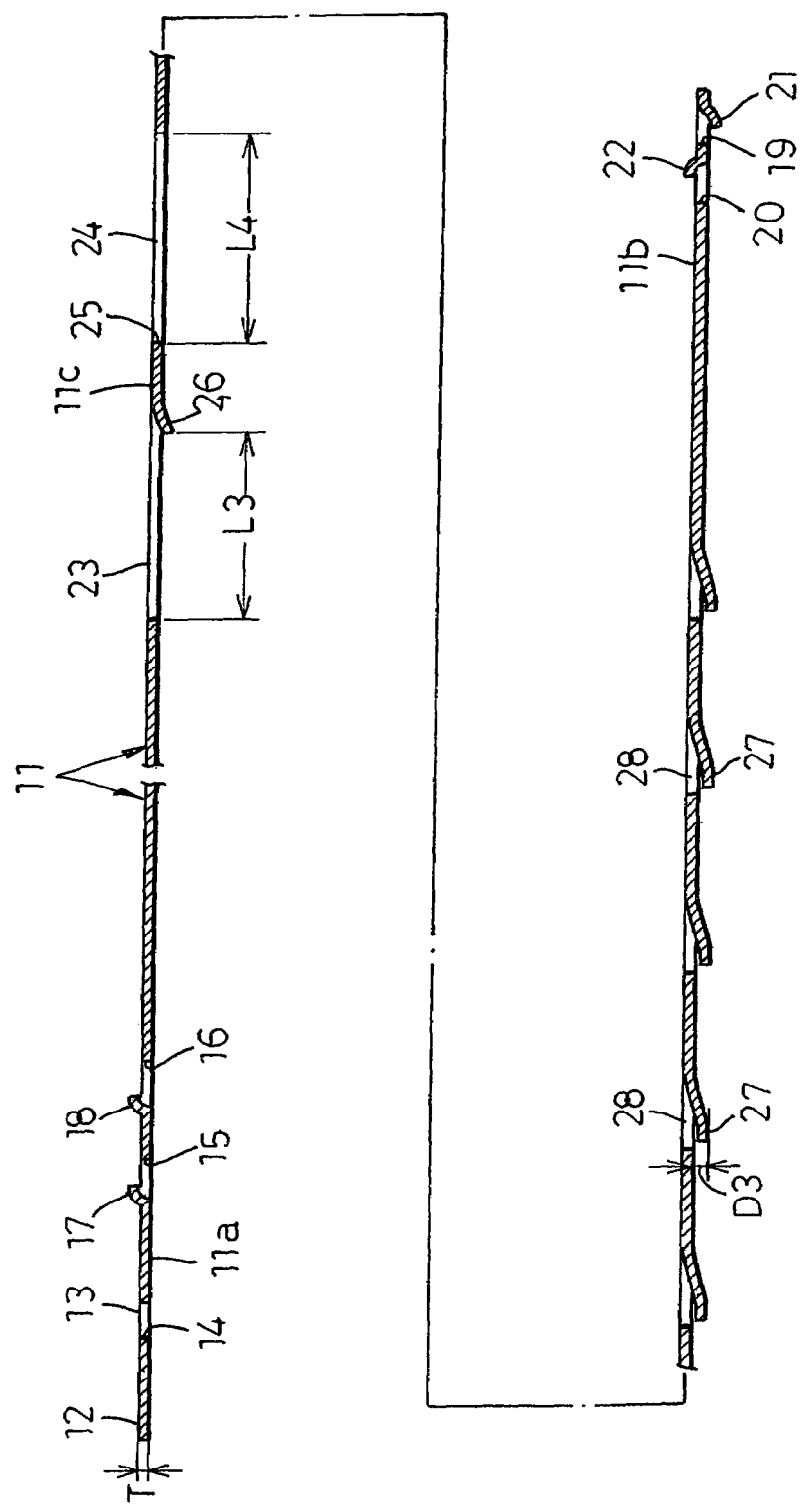
FIG. 22 is a sectional view taken along the line 22—22 in FIG. 21.

Thereafter, the metal strip material M is passed through a press bent-up die (not shown) to effect the bending-up of the first and second fixing teeth 17 and 21, first and second tool engaging teeth 18 and 22, and prop-up key 26 in the clamp band 11. The bending-up process state is as shown in FIGS. 16 and 17. In that case, whereas the first fixing tooth 17 and the first and second tool engaging teeth 18 and 22 are bent up outwardly in a raised channel shape, the second fixing tooth 21 of recessed channel shape and the prop-up key 26 are bent up reversely or inwardly.

Figure 4:
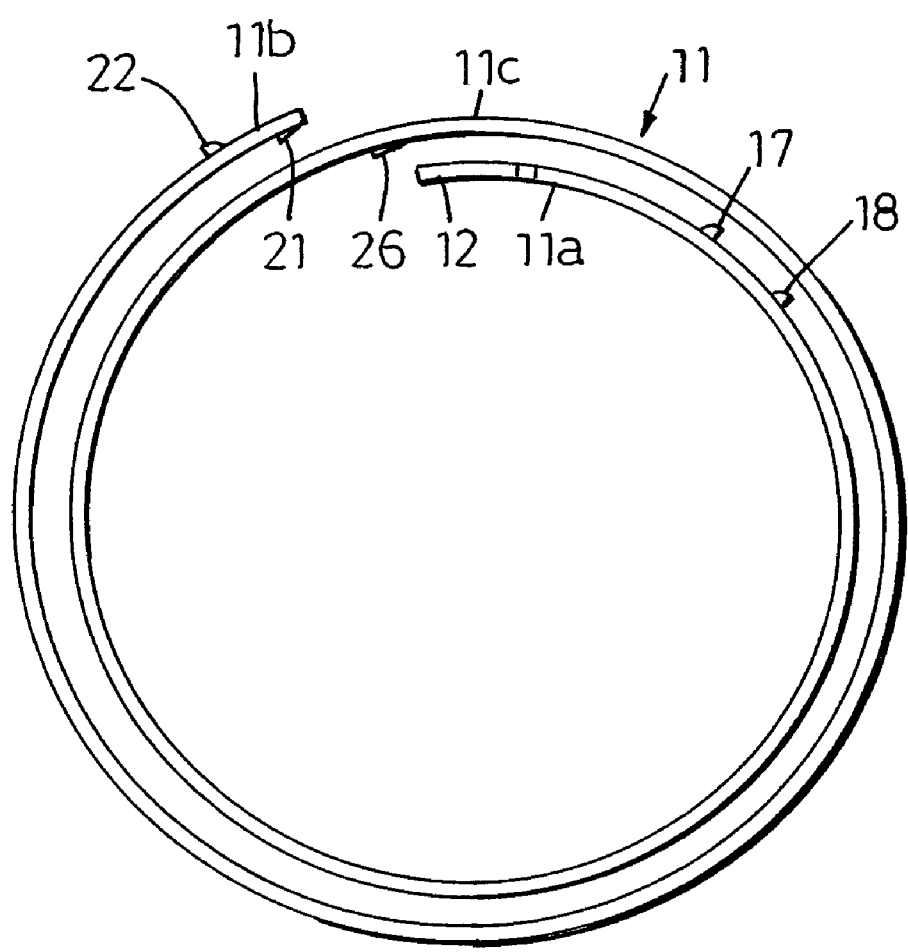
FIG. 4 is a front view of FIG. 3.
Figure 5:
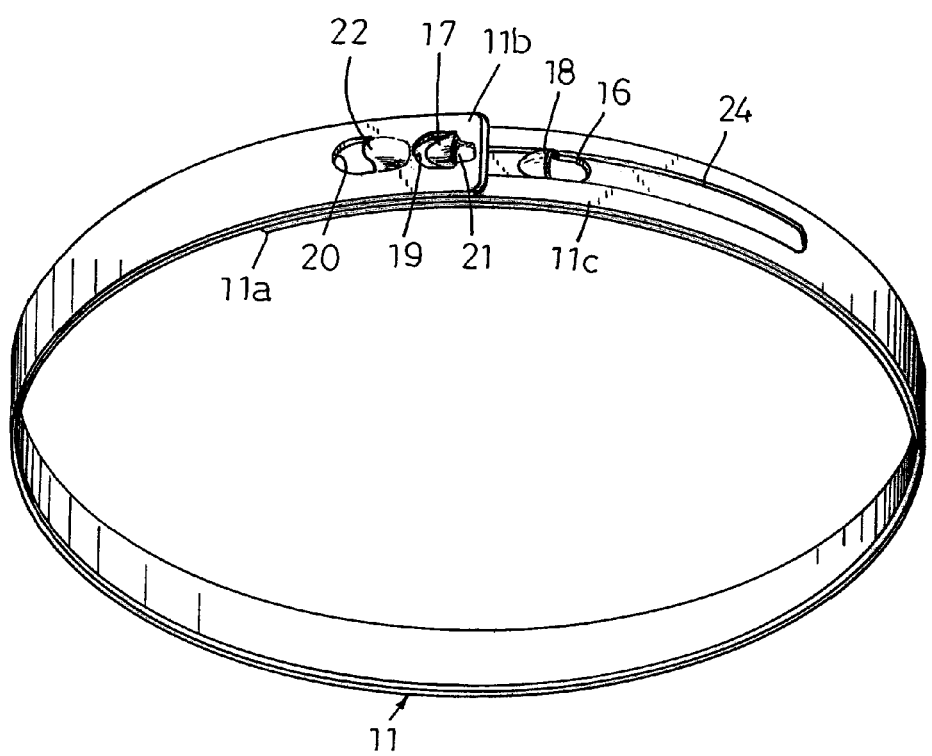
FIG. 5 is a perspective view showing the fastened state of FIG. 3.
Figure 6:
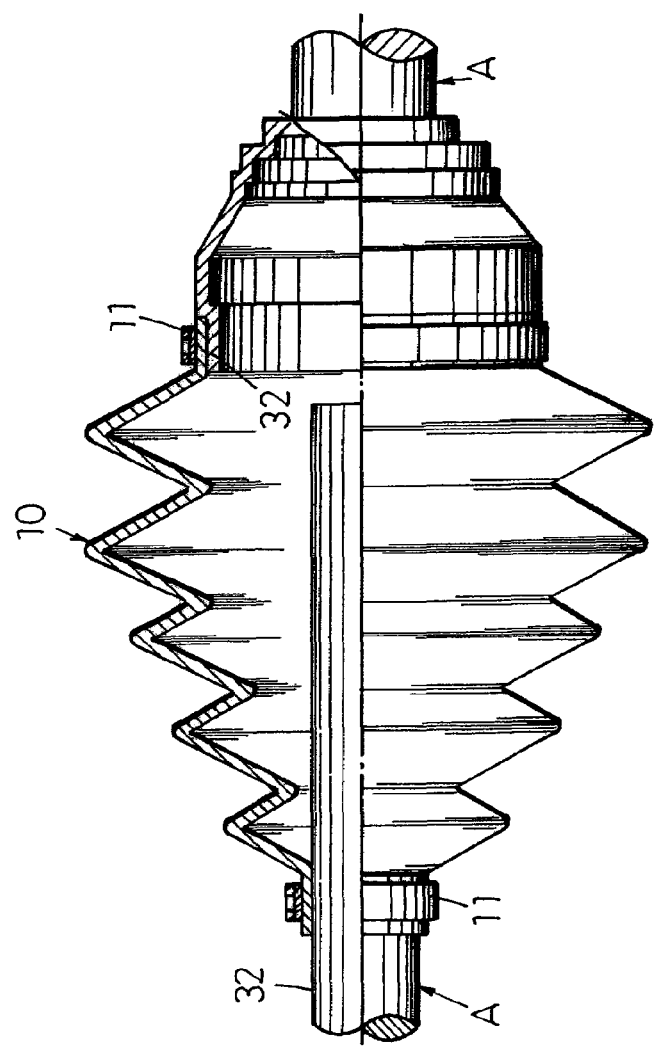
FIG. 6 is a view, in half section, showing a usage state in connection with an article to be fixed.

And subsequently, said long-sized metal strip material M is severed at a position shown by the character C—C in FIGS. 13–17, whereby it is dimensioned to be a fixed length L necessary for the clamp band 11. Finally, the clamp band 11 of fixed length L in a still developed planar state is fed from said transfer line into an unillustrated forming machine, which causes said inner and outer overlap portions 11a and 11b to overlap each other by the fixed amount X in three layers through the intermediate overlap portion 11c, roll-bent for three-dimensionalization in an overall two-loop circular coiled state, completing a product as shown in FIGS. 3–5.

Figure 13:
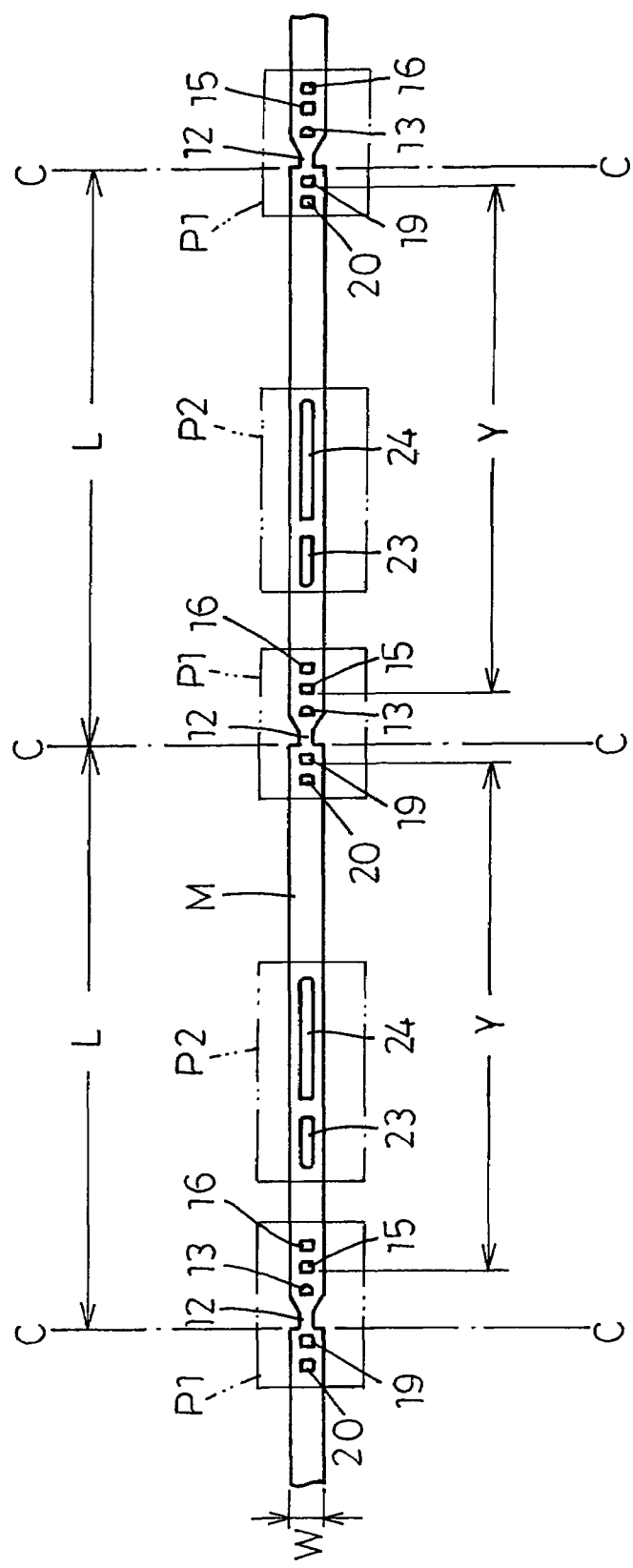
FIG. 13 is a plan view showing a process state in which a clamping device is punched out of a metal strip material.

In that case, as shown in FIG. 13, various clamping devices having bore diameters corresponding to the thicknesses of intended articles to be fixed 10 can be easily obtained by varying the distance Y between the first fixing tooth 17 bent up outwardly from the inner overlap portion 11a of the clamp band 11 and the second fixing tooth 21 bent up reversely or inwardly from the outer overlap portion 11b.

That is, the first fixing tooth 17 of the invention is bent out in an outwardly raised state from the vicinity of one severed end of the inner overlap portion 11a of the clamp band 11; therefore, in multiproduct production of clamping devices in which the bore diameter of the clamp band 11 varies, the distance Y between said first and second fixing teeth 17 and 21 can be adjusted very easily as if the clamping device were a one-loop clamping device, without causing any trouble in calculation. Because of elimination of the need to change said press die each time, the invention is extremely superior in coping with variations in the thickness of the article to be fixed 10 and in mass producibility of clamping devices.

Next, FIGS. 18–30 show second—fifth embodiments of the invention. A description has been given to the effect that the inner overlap portion 11a and the outer overlap portion 11b are each maintained in a two-layer overlap state in that the intermediate overlap portion 11c of the clamp band 11 extends in opposite directions toward one and the other roll-bent end sides from the three-layer overlap place by the fixed amount X. In the external contact region X1 extending from the tool relief reception communication hole 24 in said intermediate overlap portion 11c correspondingly positioned in the two-layer overlap place to the second tool receiving hole 20 in the outer overlap portion 11b, a plurality of float leg pieces 27 dottedly distributed throughout the external contact region X1 as shown in FIGS. 18–22 may be cut up in an obliquely inwardly bent state, by a fixed amount of depth D3 (about 1 mm, in the illustrated example) corresponding to about 1–2 times the fixed thickness T of the metal strip material M.

That is, an expansion/contraction spring force directed diametrically of the clamp band 11 is stored by floating the external contact region X1 having a plurality of float leg pieces 27 cut up and distributed therein from the internal contact region X2 so as to keep a fixed clearance S with respect to the internal contact region X2 extending from the nose receiving hole 23 in said intermediate overlap portion 11c internally contacted therewith in a two-layer overlap state to the first tool receiving hole 16 in the inner overlap portion 11a.

By so doing, even if the article to be fixed 10 is a dustproof bellows, shaft coupling boot or the like formed of rigid synthetic resin material, which has originally no elasticity, or even if the article to be fixed 10 is a fluid conveying hose made of elastic rubber material and happens to lose its elasticity due to aging as time passes, there is an advantage that the clamp band 11 can be always closely contacted with the article to be fixed 10 over the entire surface, by the action of the clamp band 11 of absorbing changes in the rigidity and thickness of the article to be fixed 10 with said float leg pieces 27 serving as the expansion/contraction spring elements of the clamp band 11 itself.

In this respect, in the second embodiment shown in FIGS. 18–22, cutting lines 28 substantially U-shaped as seen in plan view, are applied to the longitudinal centerline of the metal strip material M in a dottedly distributed state with a fixed spacing pitch and the float leg pieces 27 are bent up obliquely inwardly from the cutting lines 28 as in said prop-up key 26, with the bent-up front ends thereof being elastically contacted with the internal contact region X2 which is in two-layer overlap relation to said external contact region X1.

Figure 23:
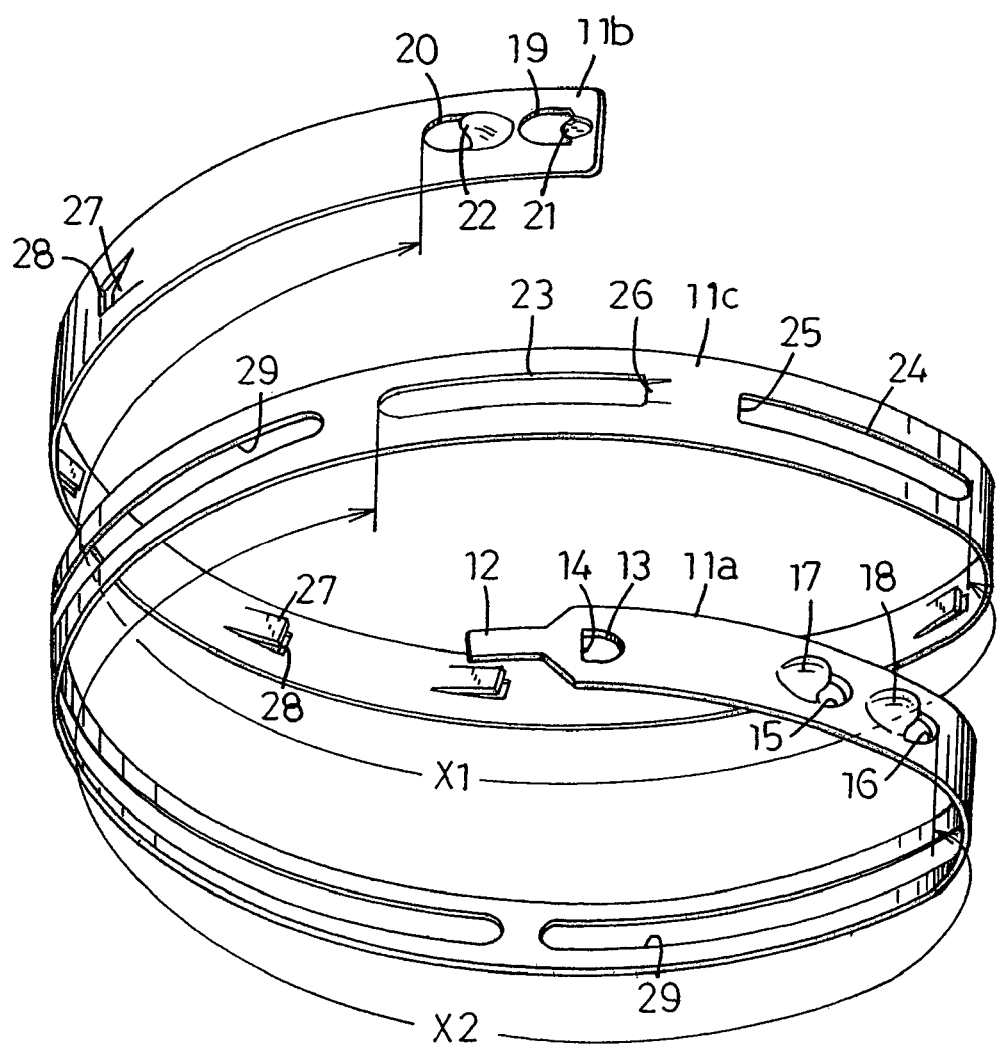
FIG. 23 is a perspective view corresponding to FIG. 3, showing a third embodiment of the invention.
Figure 24:
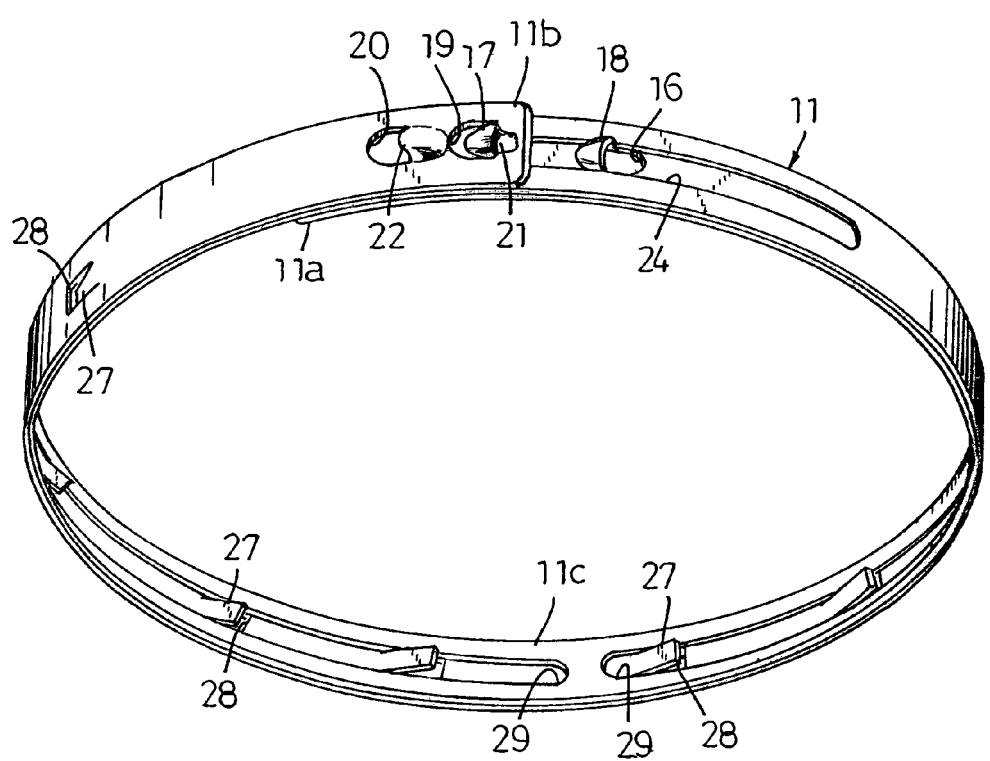
FIG. 24 is a perspective view showing the fastened state of FIG. 23.
Figure 25:
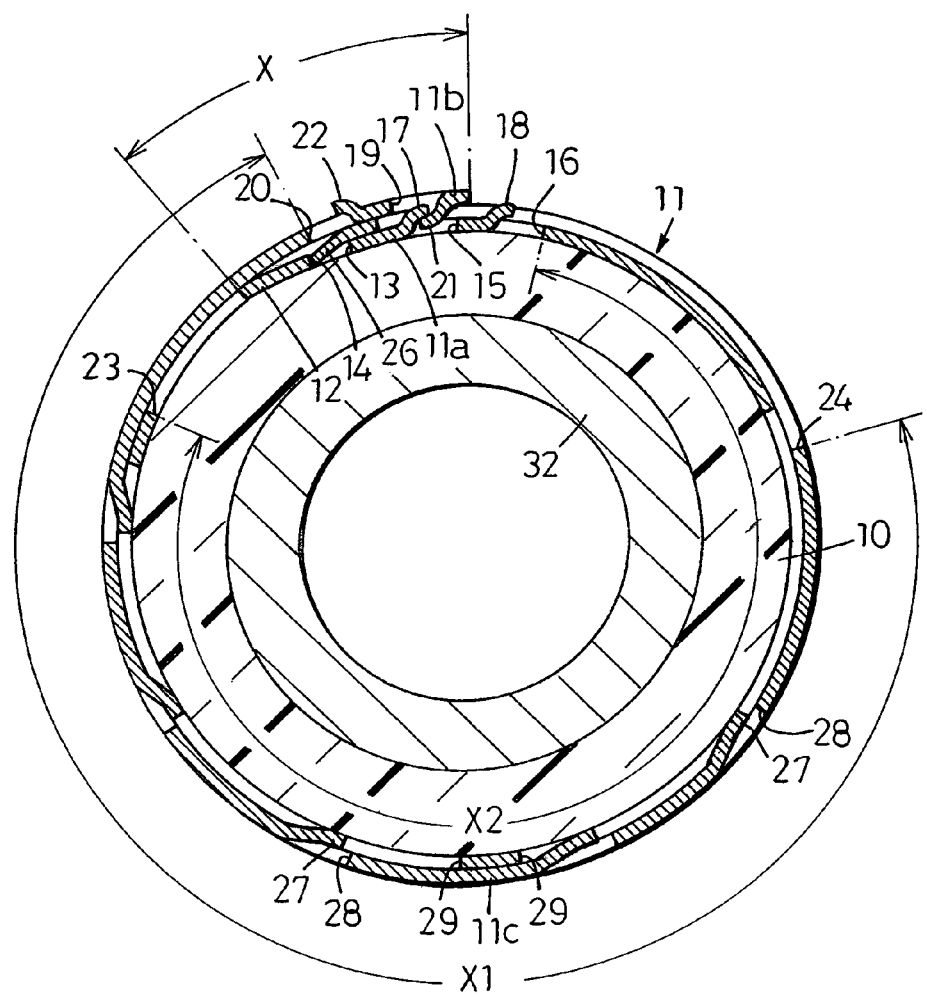
FIG. 25 is a sectional view showing a usage state of FIG. 23.

However, in a two-layer overlap place excluding the portion of the clamp band 11 overlapping in three layers by said fixed amount X, if the plurality of float leg pieces 27 interposed between the external and internal contact regions X1 and X2 can, as expansion/contraction spring elements of the clamp band 11 itself, spontaneously elastically absorb or adjust changes in the thickness or hardness of the article to be fixed 10 to allow the clamp band 11 to exert a tightening force to closely contact the article to be fixed 10 throughout the surface, then as in the case of the third embodiment of FIGS. 23–25, the plurality of float leg pieces 27 are cut up obliquely inwardly from the external contact region X1, as in the case of the second embodiment of FIGS. 18–22, and one or more of the extremely elongated leg piece receiving holes 29 for relief-wise receiving two or more of the float leg pieces 27 may be formed in the internal contact region X2 which is in two-layer overlap relation to said external contact region X1, also along the longitudinal centerline of the metal strip material M.

According to this, since the plurality of float leg pieces 27 are adapted to be relief-wise received in the leg piece receiving hole 29, there is no danger that the internal and external contact regions X2 and X1 in a two-layer overlap state are caused to undergo positional deviation free movement relatively transversely (axially of the article to be fixed) during draw operation of the clamp band 11 by an operating tool F to be later described, and there is another advantage that the clamp band 11 for the two-loop coiled type clamping device can rationally be made light in weight by punching out said leg piece receiving hole 29.

Figure 26:
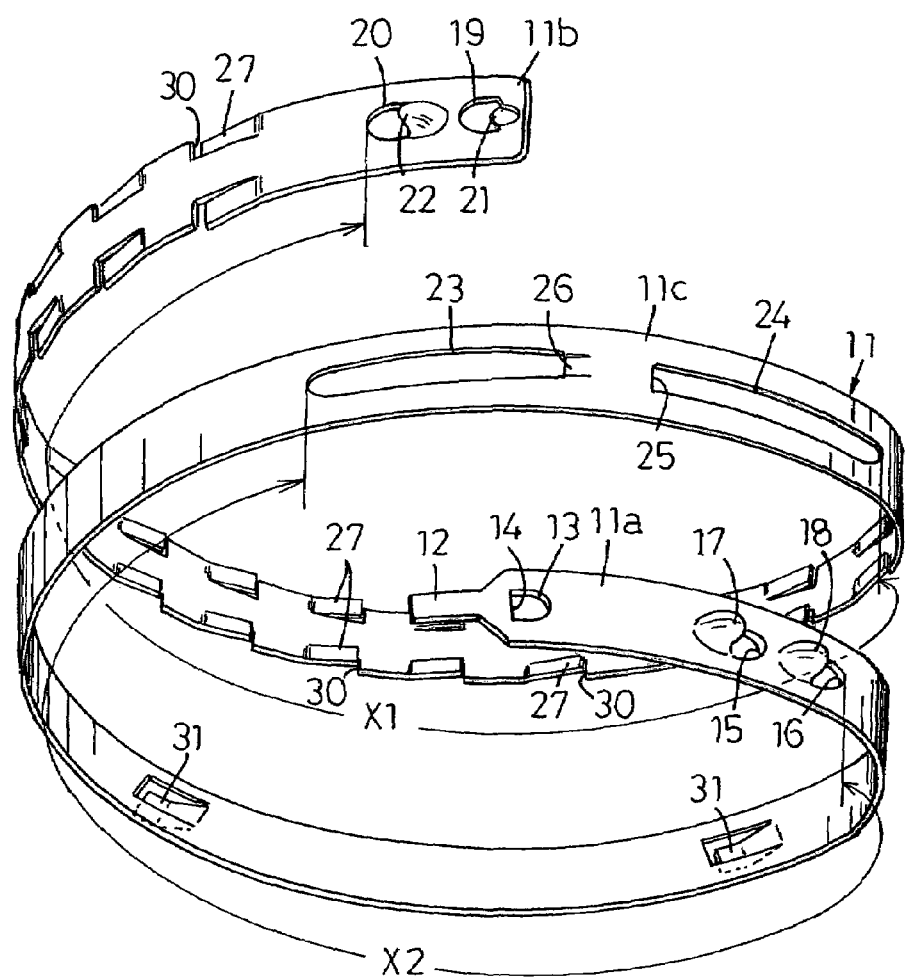
FIG. 26 is a perspective view corresponding to FIG. 3, showing a fourth embodiment of the invention.
Figure 27:
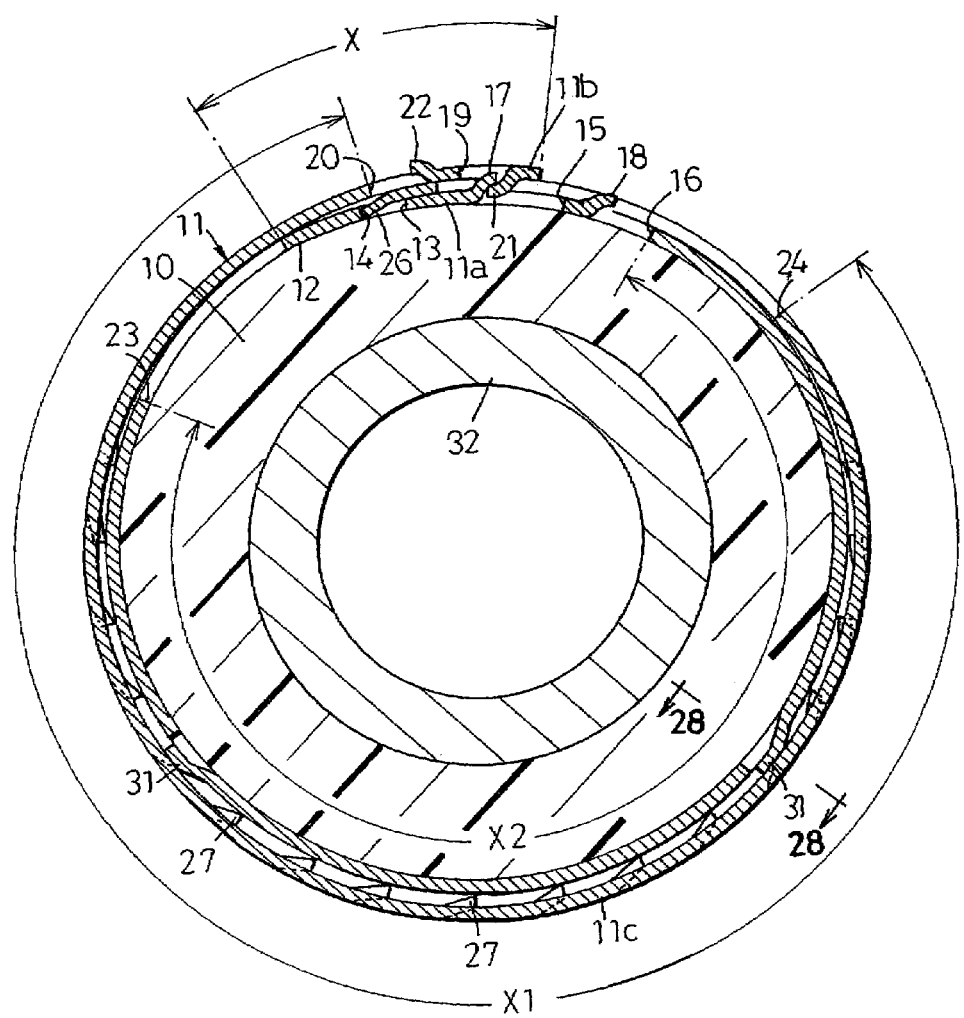
FIG. 27 is a sectional view showing a usage state of FIG. 26.
Figure 28:
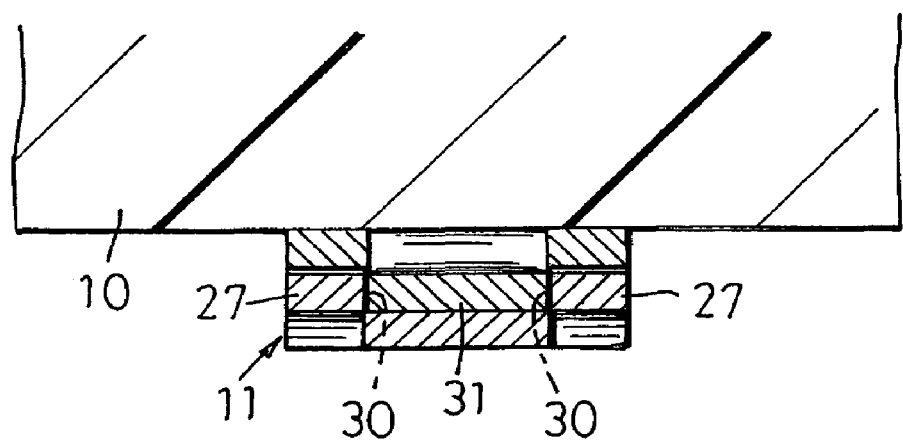
FIG. 28 is an enlarged sectional view taken along the line 28—28 in FIG. 27.

Further, as is clear from the fourth embodiment of FIGS. 26–28, cutting lines 30 in opposed symmetrical relation and L-shaped as seen in plan view are applied, in a dottedly distributed side-by-side state with a fixed spacing pitch, to opposite side edges of the metal strip material M, float leg pieces 27 are obliquely inwardly bent up from each pair of cutting lines 30, while one or more transverse shift preventing pieces 31 positioned on the longitudinal centerline of the metal strip material M can be cut up in an outwardly bent state from said internal contact region X2 of the clamp band 11, so as to be interposed between said float leg pieces 27 dottedly distributed on opposite side edges.

According to this, there is an advantage that the danger of the internal and external contact regions X2 and X1 put in said two-layer overlap state being caused to undergo positional deviation free movement relatively transversely (axially of the article to be fixed) can also be effectively prevented by the transverse shift preventing pieces 31 during the fit-setting of the clamp band 11 on the article to be fixed 10 or during drawing operation of the clamp band 11 by the operating tool F after such preparation.

Figure 29:
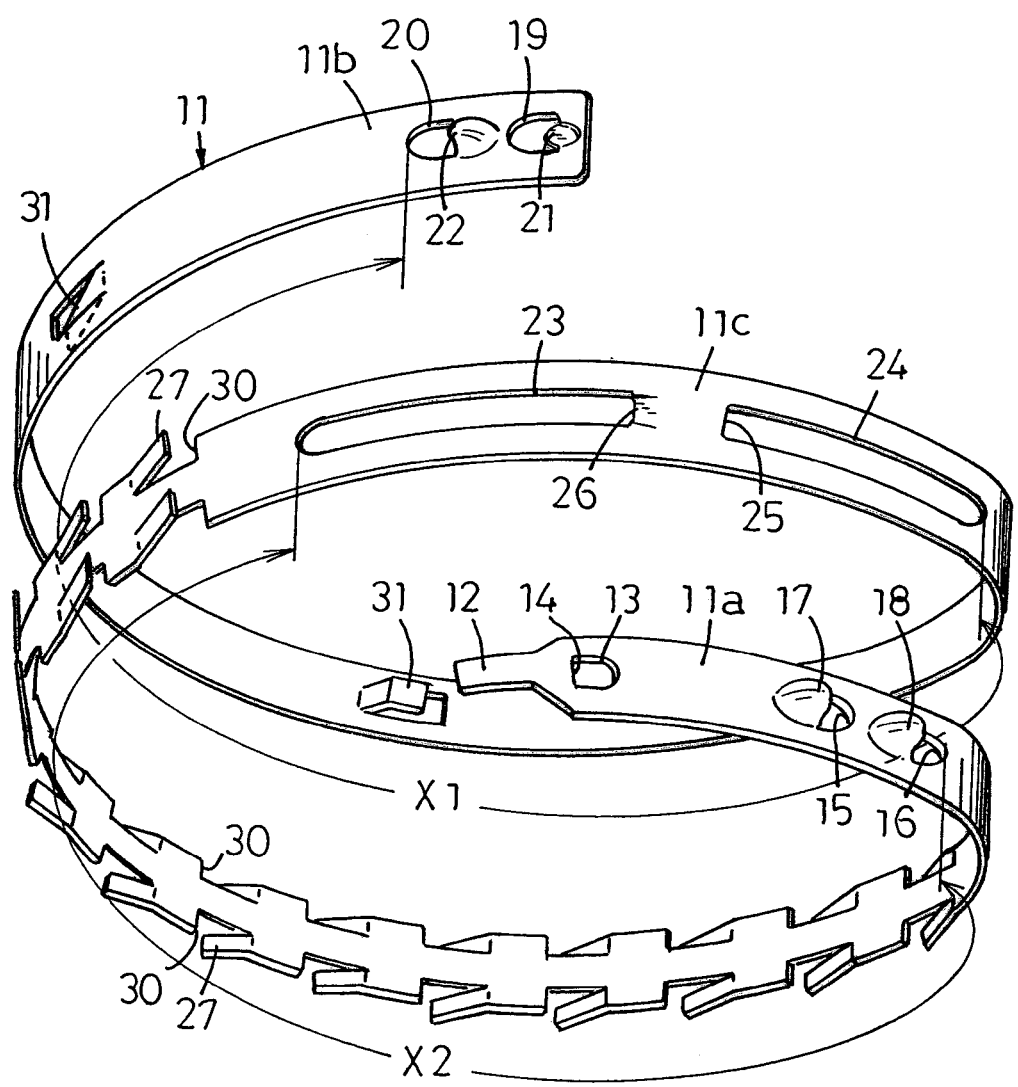
FIG. 29 is a perspective view corresponding to FIG. 3, showing a fifth embodiment of the invention.
Figure 30:
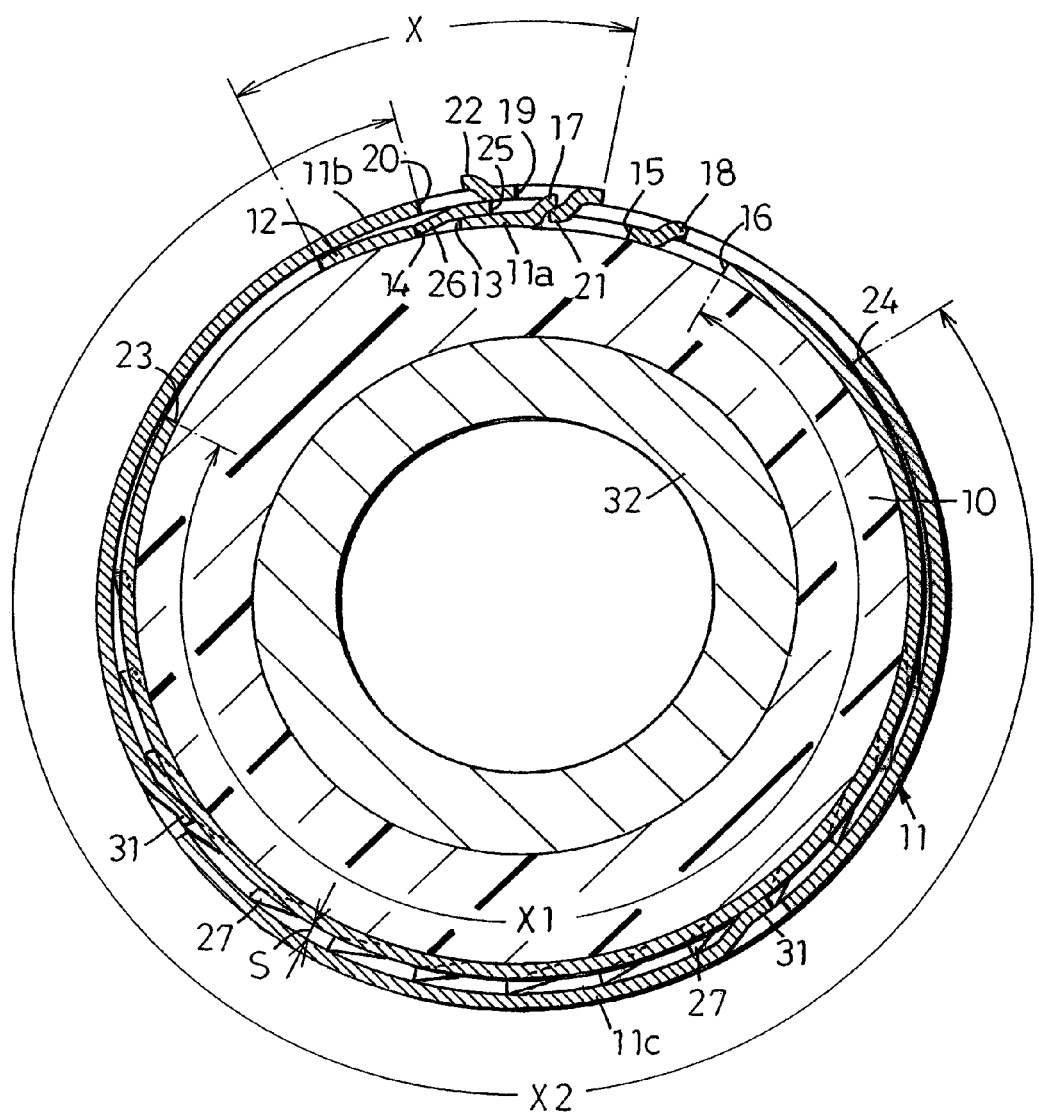
FIG. 30 is a sectional view showing a usage state of FIG. 29.

In said second—fourth embodiments, the plurality of float leg pieces 27 are cut up in an obliquely inwardly bent state from the two-layer overlapping external contact region X1 of the clamp band 11; however, as shown in the fifth embodiment of FIG. 29 and 30, said float leg pieces 27 maybe cutup reversely or obliquely outwardly from the internal contact region X2 of the clamp band 11, the cut-up front end thereof being elastically contacted with said external contact region X1.

In the fourth and fifth embodiments of FIGS. 26–30, the float leg pieces 27 are disposed in pairs in symmetrical side-by-side relation, in the opposed side edges of the metal strip material M; however, they may be bent up obliquely inwardly or outwardly in alternating staggered relation with a fixed spacing pitch from opposite side edges of the metal strip material M.

In addition, the rest of the arrangement of the second-fifth embodiments is substantially the same as in the above first embodiment of FIGS. 1–17, only reference characters are entered in FIGS. 18 through 30 in connection with FIGS. 1 through 17, and a detailed description thereof is omitted.

Figure 31:
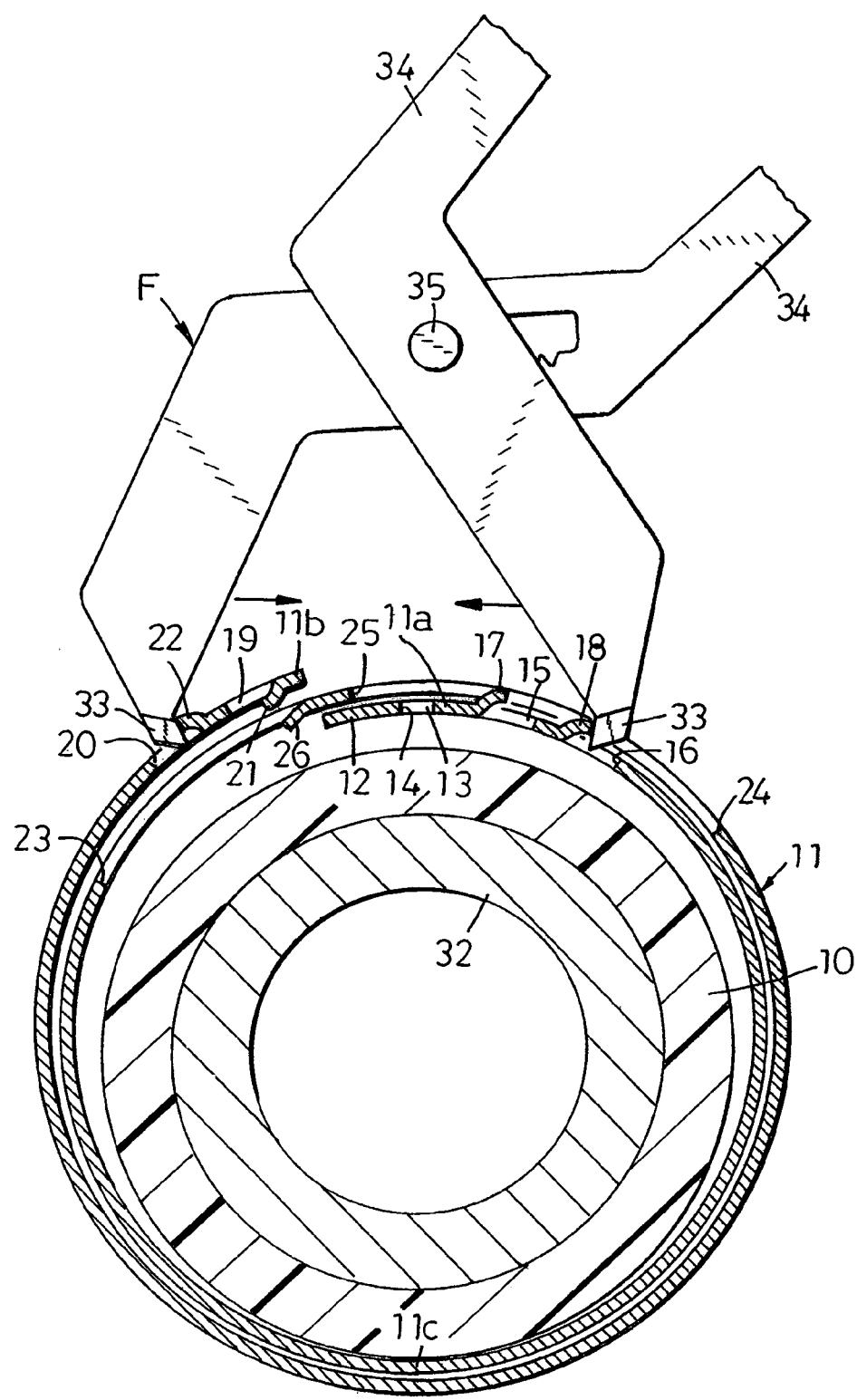
FIG. 31 is a front view showing a clamping device fit-set on an article to be fixed, and the engaged state of a draw type operating tool.

At any rate, the clamping device, which is of the two-loop coiled type, of the invention is a product which is two-loop roll-bent for three-dimensionalization as a whole with the inner and outer overlap portions 11a and 11b of the clamp band 11 held in a three-layer overlap state at an intermediate position by a fixed amount X; therefore, in fasteningly fixing a fluid conveying hose, dustproof bellows, shaft coupling boot or some other article to be fixed 10 to the connecting circumferential surface 32 of optional equipment A associated therewith, said clamp band 11 is fit-set on the article to be fixed 10 as shown in FIG. 31. However, since the clamp band 11 is of open type having both ends severed, it is not impossible to wrappingly set so as to diametrically (transversely) insert it on the article to be fixed 10.

At the initial stage of preparation with the clamp band 11 set on the article to be fixed 10, the inner and outer overlap portions 11a and 11b of the clamp band 11 overlap each other in a slacked state, with the second fixing tooth receiving hole 15 and first tool receiving hole 16 in the inner overlap portion 11a being in communication with the tool relief reception communication hole 24 in the intermediate overlap portion 11c externally contacted therewith.

And as in the case of the first fixing tooth 17 of raised channel shape bent out in an outwardly raised state from the opening edge of the second fixing tooth receiving hole 15, the first tool engaging tooth 18 of raised channel shape bent out in an outwardly raised state from the opening edge of the first tool receiving hole 16 and the second tool engaging tooth 22 of raised channel shape bent out also in an outwardly raised state from the opening edge of the second tool receiving hole 20 in the outer overlap portion 11b of the clamp band 11 are held mutually reversely directed, with the first and second tool engaging teeth 18 and 22 standing side-by-side relation through the tool relief reception communication hole 24.

In this state, a pair of working teeth 33 installed on the front ends of a draw operating tool F as shown in FIG. 31 are inserted from outside into the first and second tool engaging teeth 18 and 22 of the clamp band 11 and engaged with the latter, and then the operator strongly grips the pair of handles 34 of the operating tool F to draw said pair of working teeth 33 toward each other around the axis of an assemble pivot shaft 35.

Figure 33:
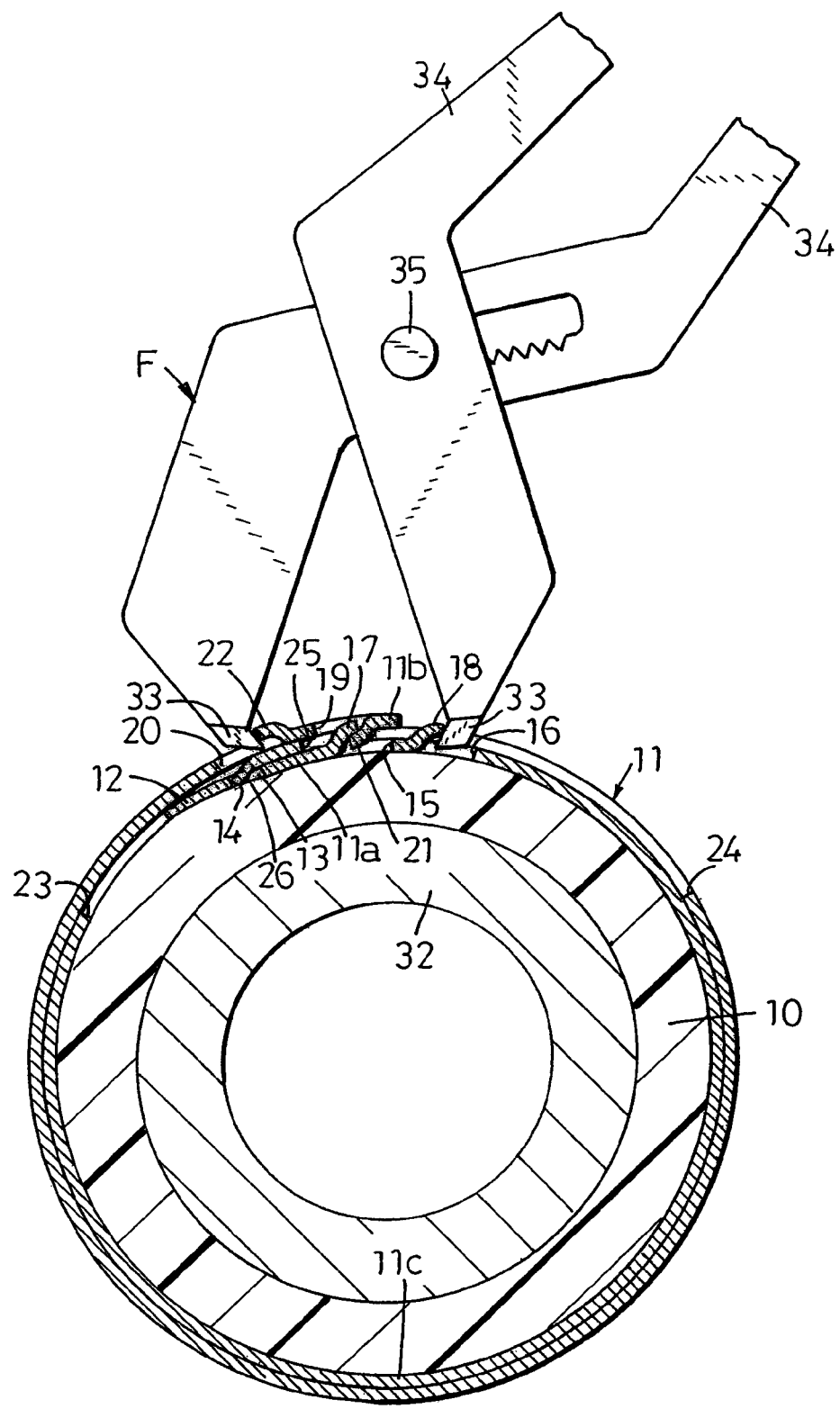
FIG. 33 is a front view showing a final fastened state with the draw operation continued from FIG. 32.

By so doing, the bore diameter of the clamp band 11 is forcibly contractively deformed from its slacked state at the initial stage of preparation as in FIG. 31 and the pilot nose 12 forming one severed end of the inner overlap portion 11a runs into the nose receiving hole 23 in the intermediate overlap portion 11c externally contacting the same, while the first fixing tooth 17 of raised channel shape bent out in an outwardly raised state from the inner overlap portion 11a and the second fixing tooth 21 of recessed channel shape bent out in a reverse or inwardly recessed state from the outer overlap portion 11b move across each other as in FIG. 33 through the tool relief reception communication hole 24 in the intermediate overlap portion 11c interposed therebetween to finally come in seizure engagement with each other by the fixed amount L2, whereupon the article to be fixed 10, as is clear also from FIGS. 6 through 12, is stably fasteningly fixed, in a uniform overall close contact state, to the connecting circumferential surface 32 of optional equipment A. After the fastening-like fixing, the working teeth 33 of the operating tool F are extracted outwardly from the clamp band 11, of course.

In that case, if the fixed height H1 of the first fixing tooth 17 bent out in an outwardly raised state from the inner overlap portion 11a, and the fixed depth D1 of the second fixing tooth 21 bent out in a reverse or inwardly recessed state from the outer overlap portion 11b are each dimensioned to be about 1.5–2.0 times the fixed thickness T of the metal strip material M, then the first and second fixing teeth 17 and 21 come in seizure engagement with each other within the tool relief reception communication hole 24 formed in the intermediate overlap portion 11c and in a plane substantially bisecting the fixed thickness of the intermediate overlap portion 11c, so that the inner and outer overlap portions 11a and 11b can be drawn to the intermediate overlap portion 11c and closely contacted therewith. As a result, a fasteningly fixed state having overall flatness and circularity is obtained.

Thus, in the two-loop coiled type claming device of the invention, unlike the known inventions described in the outset, the first fixing tooth 17 of raised channel shape bent out in an outwardly raised state from said inner overlap portion 11a of the clamp band 11 and the second fixing tooth 21 of recessed channel shape bent out in a reverse or inwardly recessed state from said outer overlap portion 11b seizure-wise engage each other by the fixed amount L2 in the communication hole 24 particularly through the tool relief reception communication hole 24 formed in said intermediate overlap portion 11c; therefore, even if said first and second fixing teeth 17 and 21 spring back after moving across each other, the post-slack in the clamp band 11 can be rationally suppressed to the minimum necessary and a superior tensile strength can also be obtained.

FIG. 34 shows a load-elongation graph (S—S curve diagram) resulting from comparative tests using as test samples the two-loop coiled type clamping device of the invention made of previously exemplified SUS 316 stainless steel sheet having a thickness T of 0.5 mm, a width W of 9 mm, and a length L of 250 mm, and roll-bent for three-dimensionalization to a bore diameter of about 35 mm, and that of the known inventions (Japanese Patent No. 2898613, described as an original state without having float leg pieces serving as expansion/contraction spring elements) described in the outset, three pieces each, by Tensile Tester "UCT-25T" of Orientic Corporation. In the graph, (▲) refers to the mean value of the invention and (□) refers to the mean value of the known inventions.

As is clear from the test results, with the two-loop coiled type clamping device of the known inventions, the elongation is 2.2 mm at the maximum load point of 6678 N, whereas in the invention, the elongation is 1.75 mm at the maximum load point of 8476 N, showing that the amount of post-slack in the clamp band 11 is remarkably reduced, exerting a high tensile strength. Therefore, with the clamping device of the invention, there is no restriction imposed on the article to be fixed 10 to which it is applied, and even if the article to be fixed 10 is a dustproof bellows, shaft coupling boot or the like formed of rigid synthetic resin material, which is originally inelastic, with a thin wall of about 1.0–1.5 mm, it can be fasteningly fixed to the connecting circumferential surface 32 of optional equipment A in an overall closely contacted state without the danger of slacking.

Figure 32:
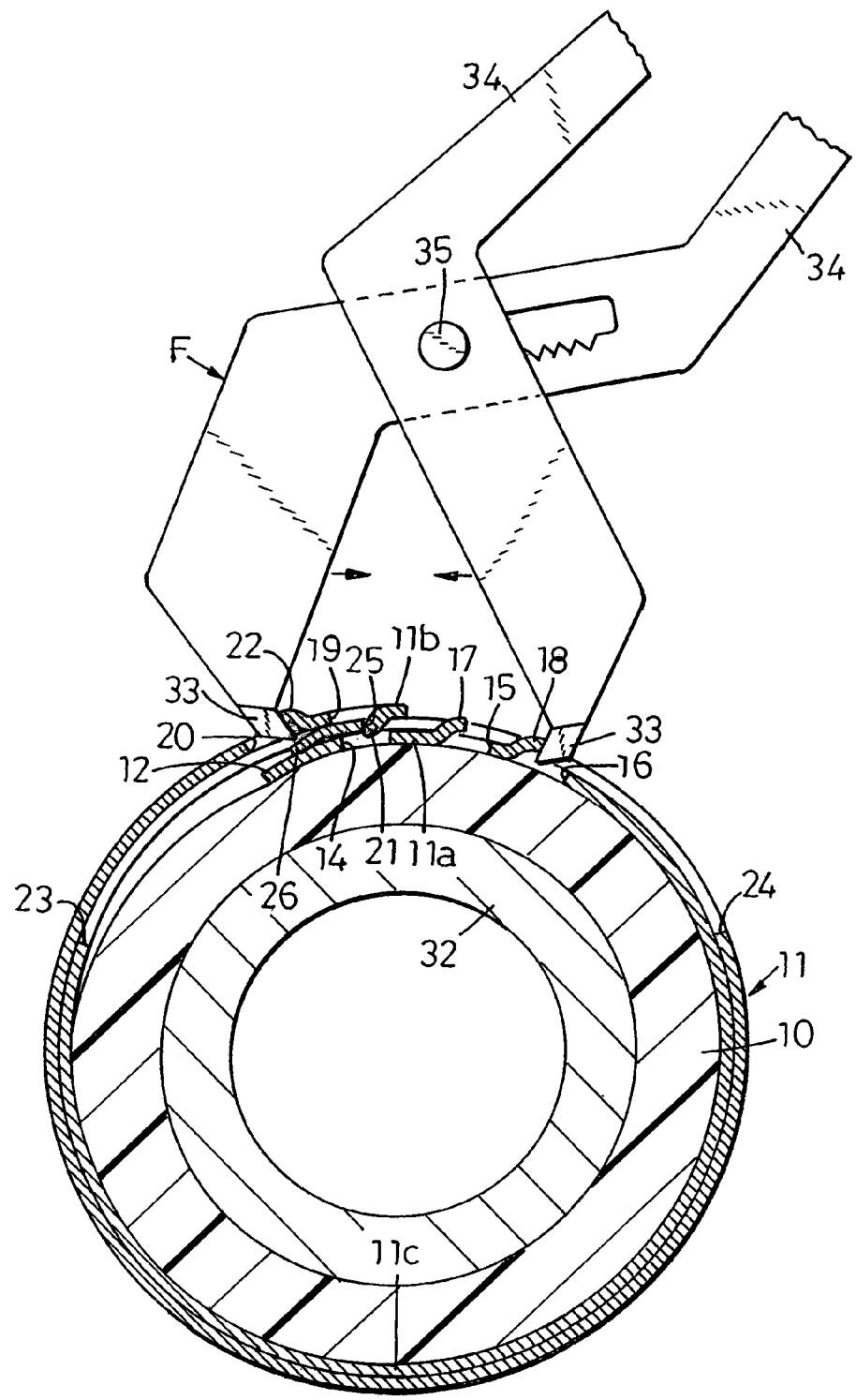
FIG. 32 is a front view showing a temporarily fixed state in an intermediate process for draw operation continued from FIG. 31.

Further, as described above as preferred arrangements, if the opening edge of the tool relief reception communication hole 24 formed in the intermediate overlap portion 11c is shaped as the second fixing tooth temporarily fixing edge 25, then in an intermediate process before the clamp band 11 reaches the intended final bore diameter, the second fixing tooth 21 of recessed channel shape of the outer overlap portion 11b, as shown in FIG. 32, can be maintained in a once seizure-wise engaged and temporarily fixed state; therefore, the amount of draw from the intermediate bore diameter of the clamp band 11 in its temporarily fixed state to the intended final boar diameter is made always constant, so that in spite of being a two-loop coiled type clamping device requiring a large amount of draw as compared with a one-loop clamping device, the drawing operation can be smoothly and conveniently performed, thereby preventing misengagement of the first and second fixing teeth 17 and 21.

Further, the opening edge of the nose receiving hole 23 formed in said intermediate overlap portion 11c is bent out in an obliquely inwardly recessed state by the fixed amount of depth D2 from the intermediate overlap portion 11c to form a prop-up key 26, while the opening edge of the engaging pin receiving hole 13 formed in the inner overlap portion 11a is shaped as the stopping edge 14 for the prop-up key 26. If the arrangement is such that when said first and second fixing teeth 17 and 21 seizure-wise engage each other by the fixed amount L2 and the clamp band 11 is fasteningly fixed at its final bore diameter, the prop-up key 26 of said intermediate overlap portion 11c is stepped by the prop-up key stopping edge 14 of the inner overlap portion 11a, as shown in FIGS. 8, 9, 12, and 33, then the prop-up restrain action makes it possible to eliminate the danger of the engaged state of the first and second fixing teeth 17 and 21 being unlocked; thus, it follows that a further stable and firm locked state is obtained.

What is claimed is:

1. A two-loop coiled clamping device wherein a clamp band made of metal strip material cut to a fixed length is roll-bent for three-dimensionalization in an overall two-loop circular coiled state in which an inner overlap portion which forms one roll-bent end side and an outer overlap portion which forms the other roll-bent end side overlap each other in three layers by a fixed amount through an intermediate overlap portion, the bore diameter of the clamp band is forcibly contractively deformed, thereby fasteningly fixing a fluid conveying hose, dustproof bellows, shaft coupling boot or some other article to be fixed made of plastic material to a connecting circumferential surface of other equipment, and wherein only one severed end of said inner overlap portion of said two-loop coiled clamping device is notched to provide a pilot nose having a fixed width narrower than a fixed width of the metal strip material itself, and a second fixing tooth receiving hole and a first tool receiving hole are distributively formed in side-by-side relation at positions successively spaced away from one severed end side of the inner overlap portion, and then a first fixing tooth of raised channel shape is bent out from the opening edge of the second fixing tooth receiving hole on the side adjacent said pilot nose and a first tool engaging tooth also of raised channel shape is bent out from the opening edge of said first tool receiving hole on the side adjacent the second fixing tooth receiving hole, in a state in which these teeth are each outwardly raised by respective fixed amounts of height, and on the other hand, said outer overlap portion has distributively formed therein a first fixing tooth receiving hole and a second tool receiving hole in side-by-side relation, successively spaced away from the other severed end side and then a second fixing tooth of recessed channel shape is bent out in an inwardly recessed state by a fixed amount of depth from the opening edge of the first fixing tooth receiving hole on the other severed end side, and a second tool engaging tooth of raised channel shape is bent out in an outwardly raised state by a fixed amount of height from the opening edge of said second tool receiving hole on the side adjacent the first fixing tooth receiving hole, said intermediate overlap portion has distributively formed therein in side-by-side relation a nose receiving hole for relief-wise receiving the pilot nose of the inner overlap portion and a tool relief reception communication hole for relief-wise receiving said first fixing tooth and first tool engaging tooth of inner overlap portion, the arrangement is such that when the working teeth of a draw type operating tool are inserted and engaged between first and second tool engaging teeth, standing upright in side-by-side relation, of said inner and outer overlap portions, respectively, so as to draw the pair of working teeth, thereby forcibly contractively deforming the bore diameter of said clamp band, the first and second fixing teeth of the inner and outer overlap portions, respectively, seizure-wise engage each other by a fixed amount through the tool relief reception communication hole in the intermediate overlap portion existing therebetween.

2. A two-loop coiled clamping device as set forth in claim 1, wherein the bent-out height of the first fixing tooth and the bent-out depth of the second fixing tooth are each dimensioned to be about 1.5–2.0 times the fixed thickness of the metal strip material.

3. A two-loop coiled clamping device as set forth in claim 1, wherein a clamp band roll-bending formation engaging pin receiving hole is formed between the pilot nose and second fixing tooth receiving hole in the inner overlap portion, and the opening edge thereof on the side adjacent the pilot nose is formed as a prop-up key stopping edge of straight line segment orthogonal to the longitudinal centerline of the clamp band, and on the other hand a prop-up key adapted to be stopped by said prop-up key stopping edge when the first and second fixing teeth seizure-wise engage each other by the fixed amount is bent out from the opening edge of the nose receiving hole in an obliquely inwardly recessed state by a fixed amount of depth.

4. A two-loop coiled clamping device as set for in claim 1, wherein the opening edge of the tool relief reception communication hole in the intermediate overlap portion on the side adjacent the nose receiving hole is formed as a second fixing tooth temporarily fixing edge of straight line segment orthogonal to the longitudinal centerline of the clamp band, and the arrangement is such that in the draw operation process for the clamp band using the operating tool, the second fixing tooth of the outer overlap portion can be caused to once seizure-wise engage the second fixing tooth temporarily fixing edge, with a temporarily fixed state established.

5. A two-loop coiled clamping device as set forth in claim 1, wherein in a two-layer overlap place excluding the portion of the clamp band overlapping in three layers by the fixed amount, a plurality of float leg pieces interposed between opposed external and internal contact regions cause the clamp band itself to store a diametrical expansion/contraction spring force.

6. A two-loop coiled clamping device as set forth in claim 1, wherein the plastic material comprises a rubber or a synthetic resin.

* * * * *

UNITED STATES PATENT AND TRADEMARK OFFICE
CERTIFICATE OF CORRECTION

| | | |
|---|---|---|
| PATENT NO. | : 7,013,534 B2 | Page 1 of 2 |
| APPLICATION NO. | : 10/863728 | |
| DATED | : March 21, 2006 | |
| INVENTOR(S) | : Kimihiko Fukawa et al. | |

It is certified that error appears in the above-identified patent and that said Letters Patent is hereby corrected as shown below:

ON COVER PAGE AT (54) TITLE

"METHOD," should read --METHOD--.

SHEET 1

FIG. 13, "CUMULATED" (both occurrences) should read --CUMULATIVE--.

SHEET 16

FIG. 17, "CUMULATED" (both occurrences) should read --CUMULATIVE--.

COLUMN 1

Line 1, "METHOD," should read --METHOD--; and
Line 53, "is" should read --are--.

COLUMN 5

Line 10, "of the" should read --wherein the--.

UNITED STATES PATENT AND TRADEMARK OFFICE
CERTIFICATE OF CORRECTION

PATENT NO.       : 7,013,534 B2
APPLICATION NO.  : 10/863728
DATED            : March 21, 2006
INVENTOR(S)      : Kimihiko Fukawa et al.

It is certified that error appears in the above-identified patent and that said Letters Patent is hereby corrected as shown below:

<u>COLUMN 11</u>

Line 38, "executes" should read --execute--.

Signed and Sealed this

Twenty-sixth Day of September, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,013,534 B2 |
| APPLICATION NO. | : 10/863728 |
| DATED | : March 21, 2006 |
| INVENTOR(S) | : Kenji Nagano |

It is certified that error appears in the above-identified patent and that said Letters Patent is hereby corrected as shown below:

This certificate supersedes Certificate of Correction issued September 26, 2006, should be vacated since no Certificate of Correction was granted for this patent number.

Signed and Sealed this

Thirty-first Day of October, 2006

JON W. DUDAS
*Director of the United States Patent and Trademark Office*